SHUTTER TIMING APPARATUS

Original Filed March 29, 1963 6 Sheets-Sheet 1

INVENTORS
JOHN P. BURGARELLA
and
JEREMY M. TOPAZ

BY

Brown and Mikulka
ATTORNEYS

INVENTORS
JOHN P. BURGARELLA
and
JEREMY M. TOPAZ

BY

Brown and Mikulka
ATTORNEYS

SHUTTER TIMING APPARATUS

Original Filed March 29, 1963 6 Sheets-Sheet 3

INVENTORS
JOHN P. BURGARELLA
and
BY JEREMY M. TOPAZ

Brown and Mikulka
ATTORNEYS

INVENTORS
JOHN P. BURGARELLA
and
JEREMY M. TOPAZ

BY

Brown and Mikulka
ATTORNEYS

INVENTORS
JOHN P. BURGARELLA
and
BY JEREMY M. TOPAZ

Brown and Mikulka
ATTORNEYS

INVENTORS
JOHN P. BURGARELLA
and
JEREMY M. TOPAZ
BY
Brown and Mikulka
ATTORNEYS

United States Patent Office

Re. 26,627
Reissued July 15, 1969

26,627
SHUTTER TIMING APPARATUS

John P. Burgarella and Jeremy M. Topaz, by Polaroid Corporation, Cambridge, Mass., a corporation of Delaware Original No. 3,205,803, dated Sept. 14, 1965, Ser. No. 268,881, Mar. 29, 1963. Application for reissue Aug. 22, 1966, Ser. No. 589,144
Int. Cl. G01j *1/00, 1/52;* G03b *9/00*
U.S. Cl. 95—10 48 Claims

Matter enclosed in heavy brackets [ ] appears in the original patent but forms no part of this reissue specification; matter printed in italics indicates the additions made by reissue.

*ABSTRACT OF THE DISCLOSURE*

*An automatic photographic exposure control system responsive to scene light in which exposure interval is determined in accordance with light received from the scene. The system utilizes an R-C network in conjunction with a photosensitive element to control basic exposure interval timing. Certain compensating features provide for correct exposure of film over a wide range of transient levels of scene illumination.*

This invention relates to shutter control means for controlling the exposure time of a camera, and more particularly to shutter control means of the type that is responsive to light from a scene being photographed for causing the exposure time to be functionally related to the level of scene brightness.

One recently developed shutter control means of the type described is provided with shutter operator means actuatable to cause the shutter means of the camera to initiate exposure, and deactuatable to cause it to terminate exposure, so that the exposure time is essentially the time that said shutter operator means is actuated. To control this time, the control means is further provided with shutter timing apparatus including a voltage sensitive trigger circuit for actuating and deactuating the shutter operator means; and an R-C network, the resistance of which is constituted by a photoconductive element whose resistance is functionally related to the level of brightness of a scene to which the element is exposed. When the R-C network is activated substantially at the same time the trigger circuit actuates the shutter operator means, it generates a trigger voltage in a period of time dependent upon the capacitance of the network and the resistance of the element as established by the level of scene brightness. The voltage sensitive trigger circuit is responsive to the voltage generated by the R-C network for deactuating said shutter operator means when the voltage reaches the trigger voltage, so that the actual exposure time, as established by the time that the shutter operator means is actuated, is essentially the time required by the R-C network, after activation, to generate the trigger voltage.

One of the problems associated with cameras utilizing shutter control means of the type described is the inability of the camera to properly expose the film being used at each level of brightness in the range from 0.195 candles/ft.$^2$ to 800 candles/ft.$^2$, the range normally of interest for both indoor and outdoor photography. To quantitatively consider this improper exposure, it is convenient to define the "exposure error" of the camera as the logarithm to the base two of the ratio of the actual exposure time at a given level of brightness as determined by the camera, to the correct exposure time as determined by the exposure value of the film at the given level, the error thus calculated being measured in "stops." Since the actual and correct exposure times are, in reality, intervals of time, it is convenient to define the initiation and termination of exposure (which together define the exposure time interval) as being respectively, the instant at which the shutter means uncovers half the area exposure aperture during movement to uncover the aperture, and the instant at which the shutter means covers half the area of the aperture during movement to cover the aperture. With this (or other conventional definition) it is possible to define and obtain the actual and correct exposure times for shutter control means of the type described, and plot the exposure error as a function of level of brightness.

When a photoconductive element is used in the conventional R-C network of the shutter timing apparatus, it is found that the exposure error is a monotonic increasing function of the level of scene brightness, which is to say that the error always increases with increases in the level of scene brightness. Moreover, there is only one level at which the error is zero, and this level, if the exposure values remain the same, can be changed by changing the capacitance of the R-C network. Thus, at levels of brightness greater than the level at which the error is zero, namely levels of brightness in the upper portion of the range of levels of interest, the error is positive, which means that the actual exposure time is greater than the correct exposure time. In this portion of the range, the shutter control means causes the film to be overexposed, and the shutter is termed "too slow." On the other hand, at levels of brightness less than the levels at which the error is zero, namely levels in the lower portion of the range of interest, the error is negative, which means that the actual exposure time is less than the correct exposure time. In this portion of the range, the shutter control means causes the film to be underexposed, and the shutter is termed "too fast."

The dominant factor contributing to the exposure error is the inherent nonlinear response of photoconductive elements in the spectral region of interest for ordinary photography purposes. That is to say, the element that senses the level of brightness of a scene being photographed, and provides a parameter which determines the interval between initiation and termination of exposure, has a level of brightness response different from that of the film being exposed. Furthermore, the anomaly of reciprocity failure of the film at levels of brightness less than the level at which the correct exposure time is about one-tenth seconds, superimposes an additive error on the error due to nonlinearity.

These errors can of course be minimized by manual adjustments to the camera, such as manually adjusting the trigger voltage an amount dependent upon the level of brightness, etc. until the exposure error is within permissible limits determined by the manufacturing tolerance on the exposure value of the film being used. However, this expedient is hardly satisfactory for "automatic" cameras. Therefore, it is a primary object of this invention to provide improved shutter control means of the type described which, while utilizing a nonlinear photoresponsive element, does not suffer from the difficulties described above, and which is particularly well adapted for use in "automatic" cameras intended for operation over a wide range of levels of brightness including levels at which the film fails in reciprocity.

It is a further object of this invention to provide improved shutter control means which is also capable of enhancing proper exposure under transient light conditions such as those created during operation of flash tube apparatus.

As a feature of this invention by which the primary object thereof is achieved, the R-C network of the shutter timing apparatus is modified in such a way that one branch of the modified network causes the latter to take a different amount of time than the unmodified network to generate the trigger voltage at levels of brightness in one portion of the range of interest to reduce the error therein, but takes substantially the same time at levels of brightness in another portion of interest; while another branch of the modified network causes the latter to take a different amount of time than the unmodified network to generate the trigger voltage at levels of brightness in said other portion of interest to reduce the error therein, but takes substantially the same time at levels of brightness in said one portion of interest.

Proper exposure under transient light conditions can be enhanced by masking the photoconductive element during operation of the apparatus under steady state light conditions and adjusting the trigger voltage so that the desired exposure is obtained under such conditions. When the light used to expose the film is to be transient in nature, as when a flash bulb is to be used, the photoconductive element is unmasked. This approach reduces the effect of the time lag in the response of the element to scene brightness that is changing at the rate usually associated with the rise-time characteristics of commonly used flash bulbs.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 6A:
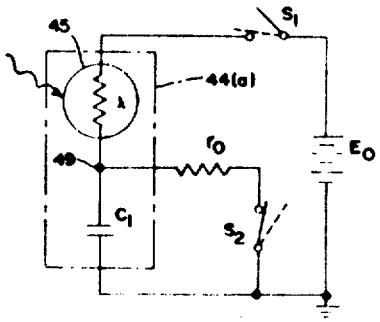
FIG. 6a is a circuit diagram illustrating conventional shutter timing apparatus compensated for nonlinearities of the photoconductive element in the upper portion of the range of levels of scene brightness of interest.
Figure 6B:
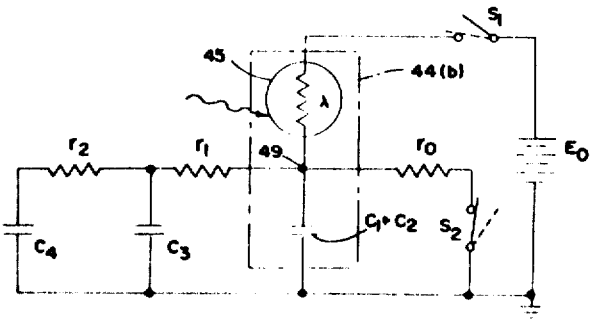
Figure 14:
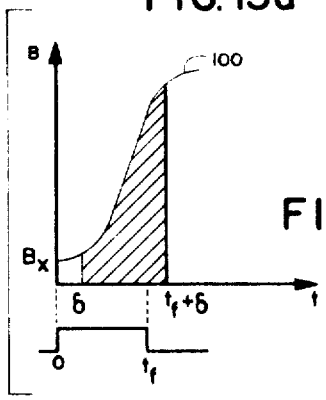
Figure 15:
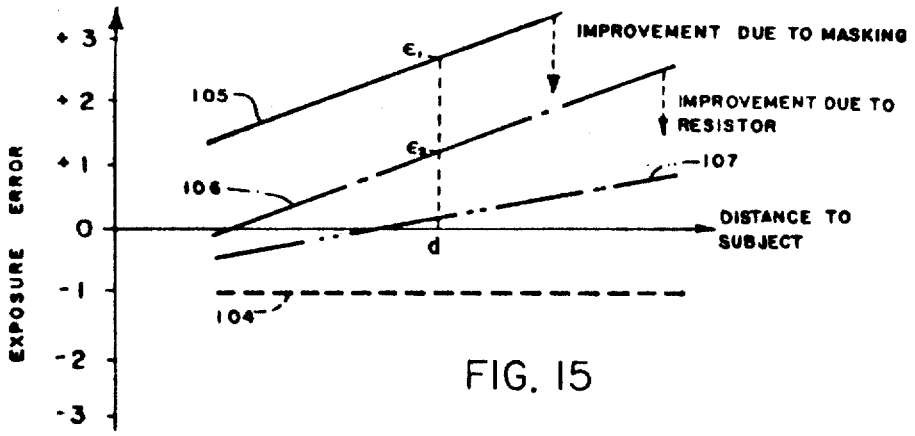
Figure 16:
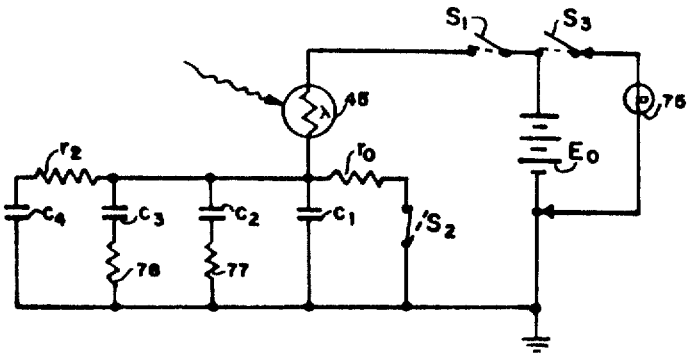

FIGS. 6b, c and d are circuit diagrams illustrating conventional shutter timing apparatus compensated for nonlinearities of the photoconductive element in the lower portion of the range of levels of scene brightness of interest for exposure apertures of various areas;

FIGS. 7–12 are graphs showing the effect on the error compensation when different parameters of the compensation means are varied;

[FIG.] *FIGS.* 13a and 13b are graphs showing the time variation in the level of brightness of a subject under flash illumination and the resistance of the photoconductive element when the subject is at two different distances from the flash;

FIG. 14 is a graph of brightness showing the time variation in the level of brightness of a subject under flash illumination for the purpose of illustrating the effect of shutter blade delay time;

FIG. 15 is a graph of exposure error as a function of distance of the subject under transient illumination showing two types of compensation;

FIG. 16 is a circuit diagram illustrating a compensated conventional shutter timing apparatus suitable for controlling exposure under transient illumination.

The shutter control means to be described is shown in the drawing as embodied into a camera having a particular type of aperture control, and a particular type of shutter means, but the latter are for the purposes of illustrating the invention in a [single] *simple* environment, it being understood that other types of aperture controls and other types of shutter means could also be used with the shutter control means disclosed and claimed herein in order to derive the new and improved results attendant thereto.

Figure 1:
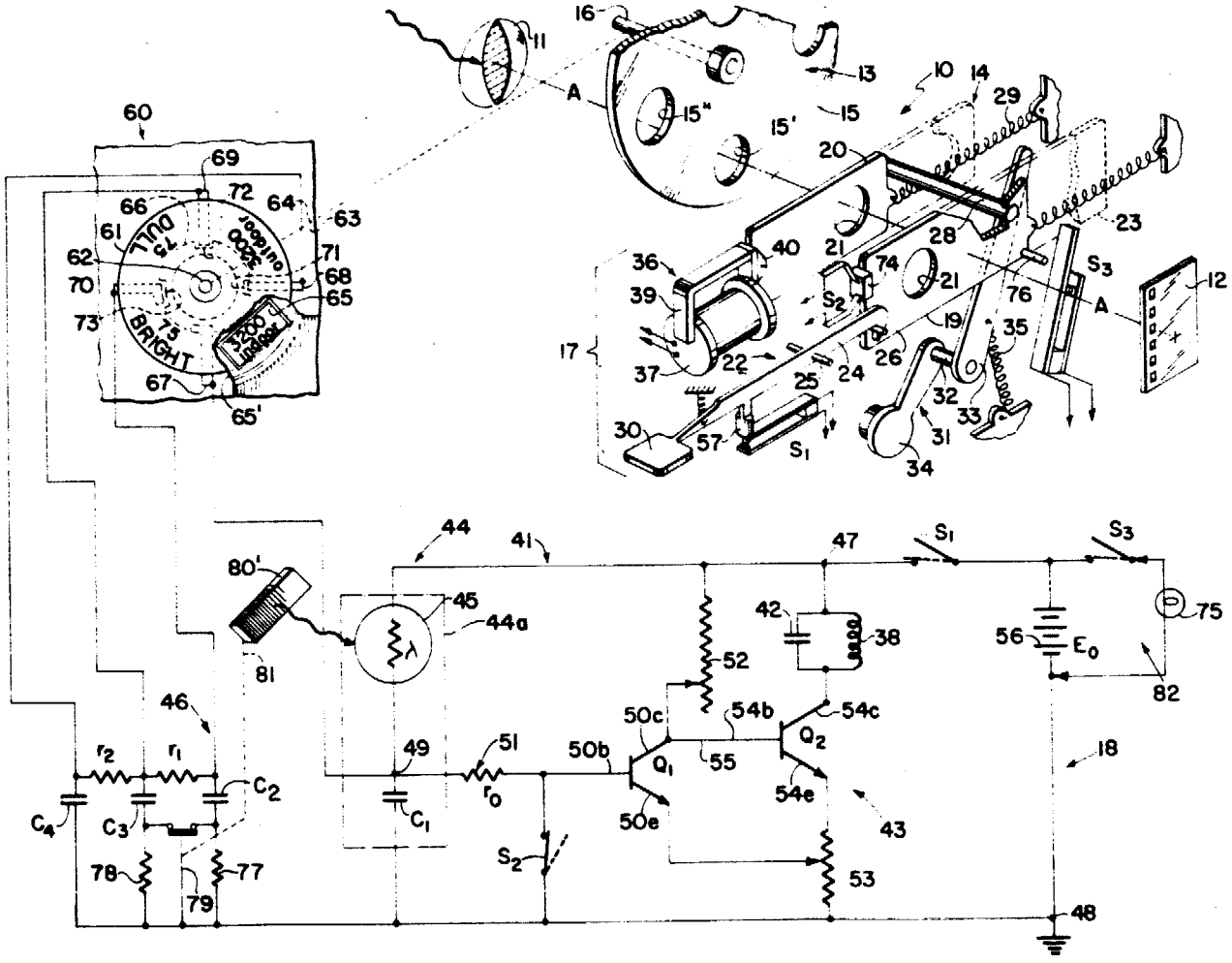
FIGURE 1 is a schematic representation of a camera showing details of the shutter mechanism in order to illustrate the manner in which the present invention is incorporated[:]

Referring now to FIGURE 1, camera 10 is shown schematically as including lens 11 for receiving light from a scene being photographed, and focusing it onto film 12 to effect exposure of the latter by the proper operation of apertured diaphragm means 13 and shutter mechanism 14 which are interposed in the optical path of the light.

Diaphragm 13 may take the form of a circular disc 15 mounted on shaft 16 rigidly fixed thereto, the latter being rotatably mounted on the camera housing. Disc 15 may contain a plurality of exposure apertures, 15', 15'', etc., of various preselected areas spaced around the periphery so that each aperture can be selectively aligned with the optical axis A—A of the camera by the selective rotation of shaft 16, which is eccentric to said axis.

Shutter mechanism 14 may include shutter means 17, and shutter control means 18. Shutter means 17 may take the form of a pair of planar, opaque blades 19 and 20, each provided with an exposure orifice 21, and mounted in tracks (not shown) so as to be normal to the optical axis, and reciprocable between terminal positions into intersection therewith. Each of the blades has one terminal position at which the solid portion overlies the exposure aperture in diaphragm means 13 and totally blocks the exposure aperture (closed position), and another terminal position at which the exposure orifice is aligned with exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be. The blade that causes exposure to be initiated is called the "opening" blade. The terminal position at which the opening blade is closed is termed the "blocking" position, while the position intermediate the two terminal positions of the opening blade at which it initiates exposure is termed the ["unblocking position"] *"unblocking" position.* Conversely, the blade that causes exposure to be terminated is called the "closing" blade. The terminal position at which the closing blade is open is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasably coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter in unblocking position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward unblocking position, and bar 28 is no longer effective to maintain closing blade 20 in its unblocking position. However, initial movement of opening blade 19, in response to the disengagement of coupling means 22 therefrom, is effective to cause shutter control means 18, in a manner to be described later, to retain closing blade 20 in its unblocking position for a preselected period of time depending on the level of scene brightness. Since the opening blade moves to unblocking position while the shutter control means releasably retains the closing blade in unblocking position, exposure is initiated. At the end of said preselected period of time, shutter control means 18 causes closing blade 20 to be released thus terminating exposure when the latter is moved from unblocking to blocking position by the action of bias spring means 29.

When exposure is terminated, blades 19 and 20 are in the position shown by the broken lines of FIGURE 1. That is to say, blade 19 is in open position and blade 20 is in closed position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in unblocking position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may take the form of an electromagnet 37 which has solenoid 38 wound around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29, and is sufficient to overcome dynamic loads imposed on the closing blade by the bottoming of the opening blade.

Shutter control means 18 further includes shutter timing apparatus 41, the purpose of which is to furnish an energizing current to the solenoid of electromagnet 37. Where the camera is to be portable and hence battery operated, it is essential to minimize current drain on the battery. With this in mind, premature release of closing blade 20 is prevented, and accurate control of the time that the closing blade is held in unblocking position is obtained, by rapidly energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic current is so high, that the solenoid current is unable to produce an attractive force that will overcome the force of spring 29 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is an initial movement of keeper 40 as the closing blade is drawn toward unblocking position by the spring bias. The time between the instant that the current in $Q_2$ is rapidly reduced and the instant that release of the closing blade is accomplished is very small in terms of the ordinary exposure interval, being only a fraction of a millisecond. For this reason, it is considered that the conduction of $Q_2$ is reduced, and movement of the closing blade begins at substantially the same time.

For the reasons set forth above, namely rapid switching of the current input to the solenoid and lower power consumption, shutter timing apparatus 41 takes the form of a transistorized, two-stage, modified Schmitt-type trigger circuit 43, responsive to the output voltage from a selectively adjustable timing circuit 44, for controlling the actuation and deactuation of shutter operator means 36. The voltage sensitive trigger circuit 43 has a normally [not-conducting] *non-conducting* stage that includes transistor $Q_1$ having base, collector and emitter electrodes 50b, 50c and 50e respectively. Collector electrode 50c of $Q_1$ is connected to terminal 47 of the shutter timing apparatus by variable bias resistor 52, and emitter electrode 50e of $Q_1$ is connected to terminal 48 of the shutter timing apparatus by variable bias resistor 53. The normally conducting stage of circuit 43 includes transistor $Q_2$ having base, collector and emitter electrodes 54b, 54c and 54e. Collector electrode 54c is connected to terminal 47 through solenoid 38 so that the latter is energized when $Q_2$ conducts. Base electrode 54b of $Q_2$ is connected to collector electrode 50c of $Q_1$ through lead 55, and emitter electrode 54e of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally [not-conducting] *non-conducting*" and "normally-conducting" it should be obvious that this characterization is applicable only when a voltage *source* is applied across terminals 47 and 48.

Selectively adjustable timing circuit 44 includes R-C circuit means comprising timing network 44(a), high end compensation branch 51, and low end compensation branch 46; and switch means 60. Timing network 44(a) includes capacitor $C_1$ in series with photoconductive element 45, such as a cadmium sulfide photocell or the like, exposed to light from the scene being photographed and having a resistance functionally related to the level of scene brightness. Network 44(a) is connected between terminals 47, 48 of the shutter timing apparatus so as to form a conventional integrator circuit whose input terminal is at 47, and whose output is at 49, the connection between the capacitor and photoconductive element.

High end compensation branch 51 takes the form of resistor $r_0$ which constitutes means coupling base electrode 50b of $Q_1$ to connection 49. Normally closed switch S2 of the timing circuit couples electrode 50b of $Q_1$ to terminal 48, and at the instant of opening, serves to activate the timing circuit as will be more apparent from the description of the sequence of events that follows. Switch means 60 serves to selectively connect an impedance in shunt with capacitor $C_1$ such that the desired modification of the exposure error is achieved at levels of brightness in the lower range of interest. To this end switch 60 comprises disc 61 of non-conducting material rigidly attached to shaft 62 that is rotatably mounted on the camera housing 63. Coupling means 64 connects shaft 62 of the switch means to shaft 16 of diaphragm means 13 so that the angular position of disc 15 is related to the angular position of disc 61. Thus, the particular aperture aligned with optical axis A—A is dependent upon the particular position of disc 61. To define such position, disc 61 is provided with indicia, quadrantly spaced, and viewable by the operator through opening 65 in cover plate 65'. Shaft 62 may project through plate 65' to provide means by which rotation of disc 61 is imparted to disc 15.

On the surface of disc 61 facing housing 63 is a circular sheet of conductive material 66 printed or otherwise applied thereto. Quadrantly spaced spring arms 67, 68, 69 and 70 are fastened to housing 63 and project upwardly into electrical contact with material 66, which is provided with notches 71, 72 and 73. Arm 67 is connected directly to connection 49, while arms 68, 69 and 70 are connected to capacitors $C_2$, $C_3$ and $C_4$ respectively. For reasons to be explained below, resistor $r_2$ connects $C_3$ and $C_4$, and resistor $r_1$ connects $C_2$ and $C_3$.

Figure 6C:
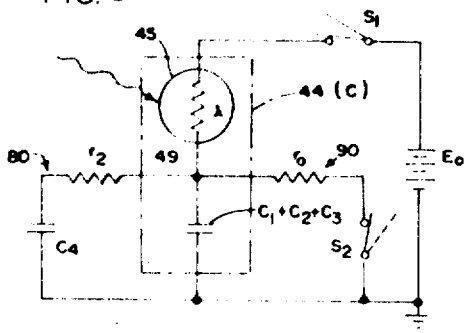
Figure 6D:
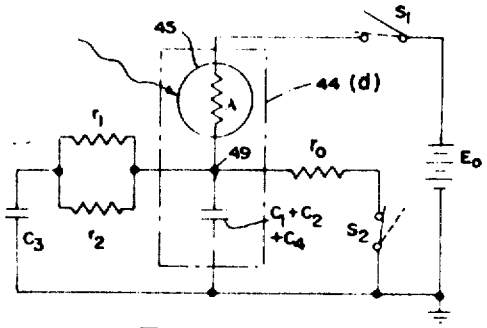
Figure 7:
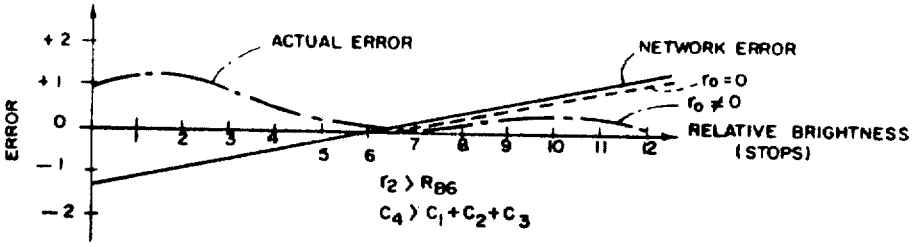

When disc 61 is in the angular position shown in FIGURE 1, contact 67 engages material 66, but notches 71, 72 and 73 are arranged so that contacts 68, 69 and 70 are spaced from the material. Thus, the timing network 44(a) consists of element 45 in series with capacitor $C_1$ as shown more clearly in FIG. 6(a). When disc 61 is rotated so that indicia "3200 outdoor" can be read through opening 65, contact 67 and 70 are the only contacts engaging material 66. Thus, the timing network 44(b), consists of element 45 series capacitor $C_1$, the latter being shunted by capacitor $C_2$, as shown more clearly in FIG. 6(b). When disc 61 is rotated so that indicia "75 [bright] *dull*" can be read through opening 65, and contacts 67, 69 and 70 are the only contacts engaging material 66. The timing network now consists of element 45 in series with capacitor $C_1$, the latter being shunted by $C_2$ and $C_3$ as shown in FIG. 6(c). Lastly, when disc 61 is rotated so that indicia "75 [dull] *bright*" can be read through opening, contacts 67, 68 and 70 are the only contacts engaging material 66. The timing network now consists of element 45 in series with capacitor $C_1$, the latter being shunted by $C_2$ and $C_4$ as shown in FIG. 6(d).

In order to apply voltage source 56, shown in the form of a battery of potential $E_0$ connected from terminal 48 to terminal 47 through normally open switch S1, in such a way as to minimize current drain on the battery, actuator lever 24 is provided with switch operating arm 57 that is engageable with one of the contacts of switch S1. When the lever is manually depressed to disengage coupling means 22 from opening blade 19, the contacts of switch S1 will be closed. The sequence of events that occur as a result of the depression of end portion 30 will now be explained, assuming that switch 60 is positioned as shown in FIGURE 1 so that the R-C circuit means consists only of timing network 44(a), by making reference to the expanded time-scale diagram shown in FIG. 2. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substantially exceeds the longest average exposure apt to be used under normal ["snap-out"] *"snap-shot"* conditions of scene brightness, the contacts of switch S1 will be closed for at least as long as the correct exposure time.

$Q_2$ conducts almost instantaneously with the closing of switch S1 since the stage including $Q_2$ is essentially a common-emitter configuration utilizing fixed base current bias. The setting of variable resistor 52 establishes the degree to which $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive-block 74 on the opening blade engages the contacts of S2 whereby the latter is closed. Assuming for the present that $r_0=0$, connection 49 is at an initial value of voltage, namely ground potential, at the instant S1 is closed. When the voltage at connection 49 is at its initial value, and the voltages at the collector and emitter electrodes of $Q_1$ are at their first values of bias voltage due to the conduction of $Q_2$, the collector-base and emitter-base junctions of $Q_1$ are reverse biased, thus resulting in $Q_1$ being cut off.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive-block 74 to disengage the contacts of S2 thereby opening the same to apply the voltage source across timing network 44(a). The opening of switch S2 thus activates the timing network and causes the latter to generate at connection 49, a time variable voltage that changes from an initial voltage when the network is activated, to a preselected voltage, termed the trigger voltage, in a period of time termed the trigger generation time of the R-C circuit. The trigger voltage is the voltage at which the emitter-base junction of $Q_1$ is forward biased, and until the voltage at connection 49 reaches the trigger voltage, the first value of the bias voltage at resistor 53 reverse biases $Q_1$ to cut off, and $Q_2$ conducts. When the R-C circuit consists only of a timing network like those of 44(a), 44(b), 44(c) and 44(d), the time t required to reach the trigger voltage $V_1$ (if $r_0$ is assumed to be zero for the time being) is given by the following:

$$t = RC \ln \frac{1}{1-\frac{V_1}{E_0}} \qquad (1)$$

where R is the resistance of element 45 as established by the level of scene brightness, C is the total capacitance of the timing network, and $E_0$ is the battery voltage. The time t, or the time for the series combination of the photoconductive element and capacitor means to generate the trigger voltage is termed the "network time." Thus, the trigger generation time of the R–C circuit when the latter consists only of the series combination of the element and capacitor means is the network time. It will be obvious to those skilled in the art that other combinations of photoconductive element and capacitor means could be used to generate the required trigger voltage, but the essential thing is that, whatever the combination, the time required to generate the required trigger voltage is termed the network time.

Figure 2:
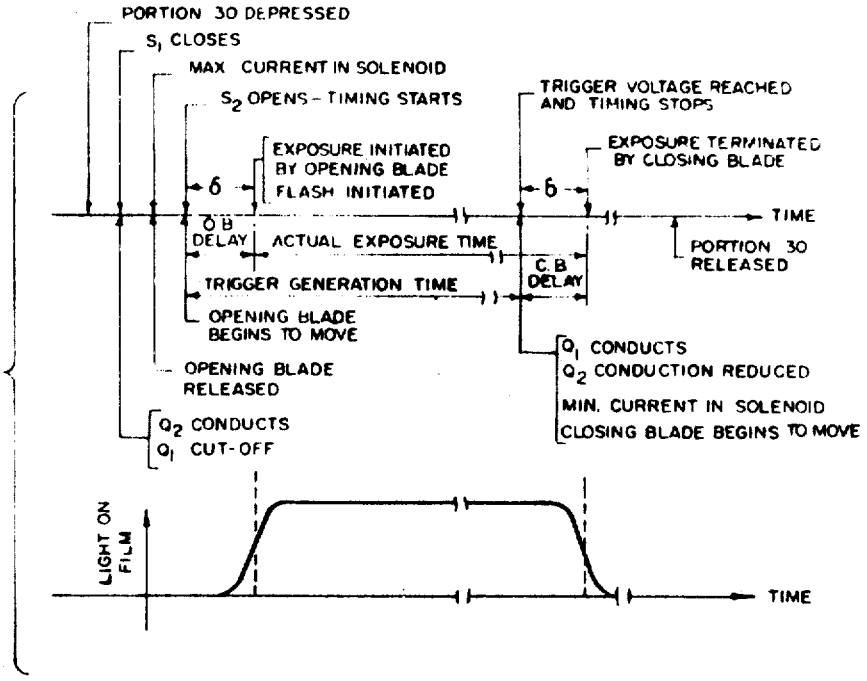
FIG. 2 is an expanded-time scale diagram showing the sequence of events required to cause exposure and indicating the manner in which the shutter means in cooperation with the exposure aperture effects the passage of light to expose the film.

During the time that the timing network is generating the trigger voltage, the opening blade moves to unblocking position and initiates exposure since the conduction of $Q_2$ causes a current to flow in the solenoid that maintains the closing blade in unblocking position as shown in FIG. 2. Therefore, it may be said that the electromagnet is energized to cause the shutter means to initiate exposure. When the voltage at connection 49 reaches the preselected value, it forward biases the emitter-base junction of $Q_1$, and the latter begins to conduct. Initially, the increased collector current of $Q_1$ flowing through bias resistor 52 increases the voltage drop thereacross to lower the voltage at the base electrode of $Q_2$. This reduces the forward bias on $Q_2$ decreasing the flow of current through the latter causing the voltage drop across bias resistor 53 to decrease thereby increasing the forward bias of $Q_1$ even more. This regenerative feedback between the stages of voltage sensitive trigger circuit 43 causes conduction to switch rapidly from $Q_2$ to $Q_1$, and the different flow of current through bias resistors 52 and 53 after the switching takes place establishes second values of bias voltages at electrodes 50*c* and 50*e* of $Q_1$, Thus, the conduction of $Q_2$ is severely and rapidly reduced by the second values of the bias voltages thereby rapidly deenergizing solenoid 38 to effect a sharp release of the closing blade as previously described.

When the closing blade is released, it begins to move out of unblocking position, and will terminate exposure at its blocking position as explained previously. Referring again to FIG. 2, it can be seen that the time interval between when timing starts (the opening of S2) and when timing stops (the trigger voltage is reached), will be exactly the same as the time interval between when exposure is initiated and when exposure is terminated, provided that the opening blade delay is the same as the closing blade delay, even though the two time intervals are not concurrent throughout. This disclosure assumes the delay times are essentially the same, so that the actual exposure time is essentially the same as the trigger generation time.

Referring again to FIG. 2, it is apparent that the time interval between the release of the opening blade and its initial movement to open S2 can be made extremely small by proper bias applied to the blade. Furthermore, the time between the closing of S1 and the attainment of maximum restraining force on the closing blade can likewise be made extremely small by various expedients. Thus, all the events that occur between the closing of S1 and the opening of S2 can be said to occur substantially at the same time. This disclosure therefore assumes that the actual exposure time is essentially the time that the current through the solenoid is sufficient to maintain the closing blade in unblocking position; or in other words, the time that the shutter operator means is actuated. As will be shown below, the problem is that the actual actuation time of the shutter operator means as established by the trigger generation time is different from the time that the shutter operator means must be actuated (correct actuation time) as required by the exposure value of the film over a wide range of levels of brightness.

In order to attain a relationship between the trigger generation time and level of brightness, resort must be made to experimental evidence on the functional relationship between the resistance of a photoconductive element like that of element 45 and the level of scene brightness. Over the range of levels of brightness of interest, a first order approximation is:

$$R=\frac{R_0}{B^{\alpha}} \text{ for } B_1 \leq B \leq B_2 \qquad (2)$$

where R is the resistance of the photoconductive element; $R_0$ is a constant; B is the level of scene brightness in the range from $B_1=0.195$ candles/ft.$^2$ to $B_2=800$ candles/ft.$^2$, the usual range of interest for ordinary photography purposes; and $\alpha=0.8$. Therefore, substitution of Equation 2 into Equation 1 yields an approximate expression for the trigger generation time of an R–C circuit consisting only of a timing network like that of 44(a):

$$t=\frac{R_0C}{B^{\alpha}} \ln \frac{1}{1-\frac{V_1}{E_0}} \qquad (3)$$

However, the correct exposure time for film of a given speed and with a given relative aperture with steady state light is obtained from the following:

$$T=\frac{K_f, A}{B^{[\alpha]}} \text{ for } B>B^1 \qquad (4)$$

where T is the correct exposure time; $K_f$,A is a constant depending on the film speed and relative aperture; and B is the level of scene brightness greater than $B^1$, the level of brightness at which T is approximately 1/10 sec., the exposure time beyond which the film fails to obey the reciprocity law expressed in Equation 4.

In accordance with the previous assumption, the correct exposure time results when the shutter operator means is actuated for such time. Therefore, a comparison of the trigger generation time (which is the time that the shutter operator means actually is actuated) with the correct exposure time will indicate whether there will be any error in exposure. It is obvious from a comparison of Equation 3 with Equation 4 that the trigger generation time of an R–C circuit, consisting only of a timing network like any of those of 44(a), 44(b), 44(c) and 44(d), has a level of brightness response that is different from that of the correct exposure time. The error thus arising is conveniently defined as the logarithm to the base two of the ratio of the network time to the correct exposure time, and is termed the network exposure error:

$$\epsilon_n=\lg_2 \frac{t}{T}=\lg_2\left[\frac{R_0C}{K_f, A} \ln \frac{1}{1-\frac{V_1}{E_0}}\right]+([2]1-\alpha) \lg_2 B \qquad (5)$$

where $\epsilon_n$ is the network exposure error in "stops." Obviously, with $\alpha \neq 1$, this error will have a functional dependence on the level of scene brightness B. This, then, provides the basis for the statement that the photoconductive element is nonlinear, which is to say that the exponent of the level of brightness in Equation 2 is different from [1] *one*. As stated above, it is found that $\alpha=0.8$ is a reasonable approximation so that Equation 5 will plot as a straight line with a slope of 0.2. Obviously, with a given set of parameters, there is only one particular value of level of brightness at which the network exposure error is zero. It is equally obvious, that the proper selection of parameters will permit any desired level of brightness to be the one at which the error is zero.

Equation 5 will be illustrated graphically by referring to two particular film speeds and three particular aperture areas, it being understood that the principles disclosed herein are applicable to more and different film speeds and aperture areas. The two film speeds arbitrarily selected are 3200 ASA and 75 ASA, and the assumption is made that one desires an "automatic exposure" camera to be operable under steady state light conditions where the level of scene brightness may vary from 0.195 candle/ft.$^2$ for an indoor scene poorly illuminated to 800 candles/ft.$^2$ for an outdoor scene brilliantly illuminated. Practical limitations due to the above assumptions result in the correct exposure times in milliseconds for the two film speeds as shown in Chart I, wherein such times are based on the following relative aperture areas: for

CHART I

| | | | | | | | | | | | | | |
|---|---|---|---|---|---|---|---|---|---|---|---|---|---|
| Scene brightness, cdl./ft.$^2$ | 0.195 | 0.39 | 0.78 | 1.56 | 3.125 | 6.25 | 12.5 | 25 | 50 | 100 | 200 | 400 | 800 |
| Relative brightness | 1 | 2 | 4 | 8 | 16 | 32 | 64 | 128 | 256 | 512 | 1,024 | 2,048 | 4,096 |
| $Lg^2$ B | 0 | 1 | 2 | 3 | 4 | 5 | 6 | 7 | 8 | 9 | 10 | 11 | 12 |
| 3,200 indoor | 168 | 84 | 42 | 21 | 10.5 | 5.25 | 2.62 | 1.31 | 0.65 | | | | |
| 3,200 outdoor | | | | | | 112 | 56 | 78 | 14 | 7 | 3.5 | 1.75 | 0.875 |
| 75 bright | | | | | | | | | 112 | 56 | 28 | 14 | 7 |
| 75 dull | | | | | | | 112 | 56 | 28 | 14 | 7 | 3.5 | 1.75 |
| Film speed | | | | | | | | | | | | | |

CHART II

Figure 5:
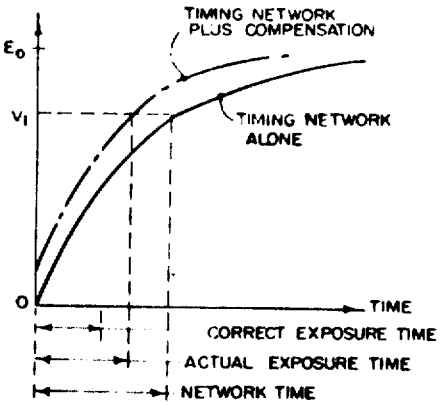

| Film speed | Desired operating range $lg_2$ B | Relative aperture area | Capacitor of timing network | Compensation configuration |
|---|---|---|---|---|
| 3,200 indoor | 0 to 8 | 1 | $C_1$ | [Fig. 5(a)] *Fig. 6(a).* |
| 3,200 outdoor | 5 to 12 | 0.047 | $C_1+C_2$ | [Fig. 5(b)] *Fig. 6(b).* |
| 75 [bright] *dull* | [8] 6 to 12 | [0.25] *1* | $C_1+C_2+C_3$ | [Fig. 5(c)] *Fig. 6(c).* |
| 75 [dull] *bright* | [6] *8* to 12 | [1] *0.25* | $C_1+C_2+C_4$ | [Fig. 5(d)] *Fig. 6(d).* |

"3200 indoor" and "75 dull," the relative aperture area is unity; for "3200 outdoor," the relative aperture area and for "75 bright," the relative aperture area is 0.25.

For reasons that will be clear later, the relation between the film speeds, relative aperture areas and capacitor configuration of the timing network associated with the speeds and aperture areas is as summarized in Chart II.

Figure 3:
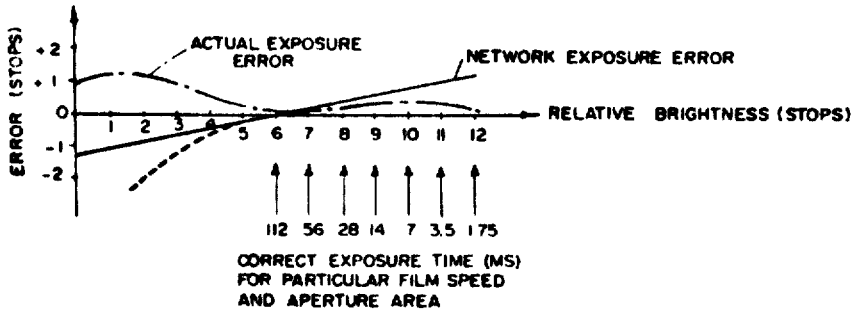
FIG. 3 is a plot of the exposure error as a function of levels of relative brightness ($lg_2$ B) of a scene being photographed showing how the exposure error of a conventional shutter timing apparatus is improved by the compensation means shown in detail in FIG. 1.
Figure 4:
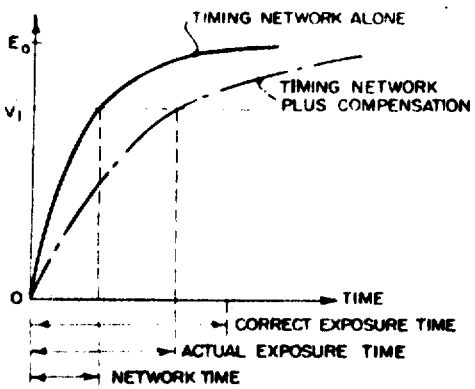
FIGS. 4 and 5 are voltage-time diagrams showing the relations between the correct exposure time, the actual exposure time, and the trigger generation time above and below the level brightness at which the exposure error is zero.

At this point it should be emphasized that the R–C circuits of shutter timing apparatus conventionally take the form of the timing networks of which 44(a) is illustrative, although a parallel combination of the photoconductive element with the capacitor might be used if desired. The illustration of Equation 5 is for the purpose of showing the error associated with conventional R–C circuits so that the means by which compensation of such error is achieved can be better understood. To this end, it will be assumed that the photoconductive element in use has a resistance which generally obeys the relation in Equation 2, and has a specific value of 10,000 ohms at a level of relative brightness of 64 ($lg_2B=6$), the level at which, for one reason or another, the exposure error is to be zero for the 3200 indoor film-aperture program of Charts I and II. It is found that with $C_1=0.2\mu f.$, the ratio of trigger voltage to battery voltage of 0.73 is necessary to cause the network time as determined by Equation 3 to be 2.62 ms., the correct exposure time. With the parameters thus establshed Equation 5 reduces to:

$$\epsilon_n=1.2+0.21g_2\ B \qquad (6)$$

which is the straight line shown in FIG. 3 labeled "network exposure error."

An important conclusion to be drawn from the nature of the relationship between the network exposure error and level of brightness is: at levels of brightness greater than the level at which the error is zero, the error is positive, which means the network time is greater than the correct exposure time, and the film is overexposed; (see FIG. [4] *5*); while at levels of brightness less than the level at which the error is zero, the error is negative, which means the network time is less than the correct exposure time, and the film is underexposed (see FIG. [5] *4*).

The above discussion qualitatively illustrates why a conventional timing network, which includes a nonlinear photoconductive element, is inherently incapable of providing the correct exposure over a wide range of levels of brightness. Actually, the network exposure error for a real element is slightly curved with increasing slope at increasing levels of brightness. In addition to this, errors introduced by the failure of the film to obey the reciprocity law of Equation 4 will affect the ability of the camera to properly expose film. Thus, with a relatively small aperture area, the correct exposure time will be greater than the maximum time at which the film obeys the reciprocity law of Equation 4, when the level of brightness is less than the level which is associated with the minimum. Obviously, the effect of this factor on the error curve is dependent upon the exposure times associated with the levels of brightness. However, such effect is most pronounced at the lower end of the error curve as suggested by the dashed extension to the network exposure error shown in FIG. 3.

Recalling now that the network error curve shown in FIG. 3 is applicable to 3200 ASA film with a relative aperture area of 1 (see Chart II) it is apparent that beyond 50 candles/ft.$^2$, the correct exposure time becomes extremely small, being 0.65 ms. (*1/1540* second) at this level of brightness. The correct exposure time (or trigger actuation time) at levels above 50 candles/ft.$^2$ becomes of the order of magnitude of the blade delay of the shutter means so that timing may begin and end before exposure actually begins. At this point, the efficiency of the shutter means affects the correct exposure time as suggested by the lower curve of FIG. 2.

To improve the results, both from the standpoint of exposure error and depth of field, it is desirable to decrease the aperture area. If the electrical parameters remain unchanged with over a twenty-fold reduction in aperture area, the exposure error curve would shift laterally toward higher levels of brightness so that at a brightness of 12.5 candles/ft.$^2$, the error would be −4.4. Thus, in the range of interest, namely from12.5 candles/ft.$^2$ and greater the exposure error would vary from −4.4 to −3.1 stops, certainly not a satisfactory situation. However, if the value of the capacitor in the timing network were increased in the same proportion that the aperture area is decreased, the result would be an exposure error curve that remained zero at the same level of brightness as was previously the case. An important conclusion to be drawn from this is the fact that once the exposure error curve is established for a given film with a given aperture area by the proper selection of the value of the capacitor in the timing network, the exposure error curve for the same film with a different aperture area can be shifted at will by properly changing the capacitor value.

Design philosophy beyond the scope of this disclosure controls the level of brightness at which the exposure error is to be made zero for each film speed-aperture area program of the camera. To simplify the description of the compensation means that beneficially corrects the error, it will be assumed that the crossover level (the level at which the error is zero) for each of the film speed-aperture area programs is to remain fixed. Having assumed $C_1=0.2\ \mu f$, this fixes the other values of capacitors as follows: $C_2=4\ \mu f.$; $C_3=4\ \mu f.$ and $C_4=28.6\ \mu f.$ Thus, the curve labeled network exposure error described the error associated with the timing networks 44(a), 44(b), 44(c) and 44(d). The remainder of this disclosure is addressed to the problem of changing the error curve in a beneficial manner at levels of brightness above and below the crossover level.

The problem is solved by modifying the conventional timing network connected between terminals 47 and 48 in such a way that one branch of the resultant R-C circuit causes the trigger generation time to be longer than the network time (the latter being the trigger generation time of an R-C circuit consisting of the photoconductive element in series with the proper capacitor means) at levels of brightness below the crossover level, without substantially changing the network time at levels of brightness above the crossover level; while another branch of the resultant R-C circuit causes the trigger generation time to be shorter than the network time at levels of brightness above the crossover level, without substantially changing the network time at levels of brightness below the crossover level. Taken together, then, each branch is effective to achieve a beneficial modification of but one portion of the error curve without having such modification affect the other portion.

The branch that beneficially modifies the error curve above the crossover includes resistor $r_0$ and switch S2. The sequence of events, so far as switches S1 and S2 are concerned, is: first, S1 is closed by the act of disengaging the coupling means thereby causing current to flow through element 45 and resistor $r_0$ to establish an initial charge on capacitor $C_1$; and second, S2 is opened by the movement of the opening blade. The initial charge on the capacitor is given by:

$$\gamma[=]\simeq\frac{r_0}{R+r_0}E_0 \qquad (7)$$

where $\gamma$ is the initial charge. Since R, the resistance of the photo-conductive element is related to the level of brightness, the initial charge on the capacitor is greater at levels of brightness at which R is of the same order of magnitude as $r_0$. Proper selection of the value of $r_0$ can thus be made. Generally, a value of $r_0$ is selected which is of the same order of magnitude as the element resistance at levels of brightness greater than the crossover level.

The branch that beneficially modifies the error curve below the crossover comprises various combinations of the resistors $r_1$, $r_2$ and the capacitors $C_2$, $C_3$ and $C_4$. The exact form of the combination of impedances depends upon many factors. In this disclosure, relating to a compact portable, battery operated camera, where space and complexity are to be minimized, only those capacitors not needed to establish the crossover level are available for error compensation purposes, although more complicated and sophisticated compensating networks could be used with other capacitors and resistors, in order to achieve greater error control.

The degree to which it is desired to correct the exposure error depends upon such things as how small the actual error is required to be in order to meet design criterions, upon the extent to which the film fails to obey the reciprocity law, etc. Therefore, the general approach to compensation by coupling of an impedance to the timing network to alter the trigger generation time is the more important part of this invention, the details of exact parameters used being of secondary importance once the basic concept is appreciated.

Consider first the film-aperture program resulting in the impedance configuration shown in FIG. 6(c) which arises when the operator rotates disc 61 until the indicia "75 dull' appears at opening 65. With such configuration, the voltage V at connection 49 is as follows:

$$\left[\frac{V}{E_0}=1\ \exp.\ \frac{-\alpha_1}{\alpha_2}t\left[(1-\alpha_5)\cosh\frac{\alpha_4}{\alpha_2}t+\left(\frac{\alpha_3+\alpha_5\alpha_1-2\alpha_5\alpha_0}{\alpha_4}\right)\sinh\frac{\alpha_4}{\alpha^2}t\right]\right]$$

$$\frac{V}{E_0}=1-e^{\frac{-\alpha_1}{\alpha_2}t}\left[(1-\alpha_5)\cosh\frac{\alpha_4}{\alpha_2}t+\left(\frac{\alpha_3+\alpha_5\alpha_1-2\alpha_5\alpha_0}{\alpha_4}\right)\sinh\frac{\alpha_4}{\alpha_2}t\right] \qquad (8)$$

where:

$$\alpha_0=\frac{C_1+C_2+C_3}{C_4}\quad \alpha_1=\frac{C_1+C_2+C_3}{C_4}+1+\frac{r_2}{R}=1.287+\frac{r_2}{R}$$

$$\alpha_2=2r_2(C_1+C_2+C_3)=16.4\times10^{-6}\,r_2$$

$$\alpha_3=\frac{C_1+C_2+C_3}{C_4}+1-\frac{r_2}{R}=1.287-\frac{r_2}{R}$$

$$\alpha_4=\alpha_1^2-4\cdot\frac{r_2}{R}\cdot\frac{C_1+C_2+C_3}{C_4}=\alpha_1^2-1.148\,\frac{r_2}{R}$$

$$\alpha_5=\left(1-\frac{r_0}{R+r_0}\right)=\frac{r_0}{R+r_0}$$

With the constraint on $C_1$, $C_2$ and $C_4$ already established, the selection of the particular value of $r_2$ and $r_0$ will depend upon the amount of compensation desired. In general, when $C_4>C_1+C_2+C_3$, adequate compensation is obtained when $r_2$ is greater than the value of the resistance of the photoconductive element at the crossover level, and $r_0$ is of the order of magnitudes of the resistance of the photoconductive element at levels in the region of interest above the crossover level. In the example computed above, adequate compensation is obtained when $r_2=8{,}000$ ohms and $r_0=150$ ohms, since the crossover resistance of the element was assumed to be 10,000 ohms. Using these values in Equation 8, the curve labeled "actual exposure error" in FIG. 3 is obtained by computing, at each level of brightness, the time for the ratio of the voltage at connection 49 to the battery voltage to equal 0.73, the assumed trigger voltage ratio. Such time is the trigger generation time, and the error is found by taking the logarithm to the base two of the ratio of the trigger generation time to the correct exposure time.

The actual exposure error curve of FIG. 3 has been computed on the basis that the film exerywhere obeyed the reciprocity law expressed in Equation 4. For the film-aperture program chosen, however, this assumption is incorrect at levels of brightness below which $\lg_2 B=6$. Thus, in this region, the correct exposure time is longer than was assumed to compute the curve. Hence, the error is really less than is shown in the drawing. [This is suggested by the dotted line extension of the actual exposure error in FIG. 3 in the lower region of interest.]

Branch 80 of the compensating means shown in FIG. 6(c) comprises a series impedance formed by $r_2$ and $C_4$ shunting the capacitor of the timing network $$(C_1+C_2+C_3)$$

while branch 90 comprises resistor $r_0$ in series with switch S2. The ability of branch 80 alone to compensate the network error can be seen in FIG. 7 which shows the network error curve, and the actual exposure error when the compensating means includes either branches 80 and 90, or branch 80 alone ($r_0=0$). Thus, each branch is effective over a preselected portion of the range of levels of scene brightness of interest to compensate the network error.

Figure 8:
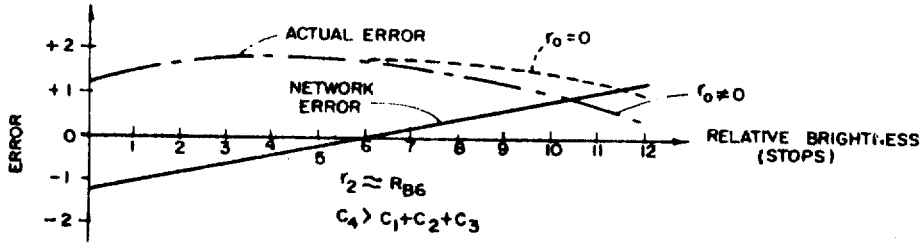
Figure 9:
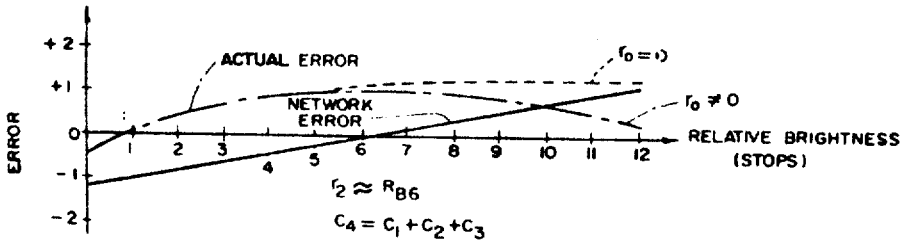
Figure 10:
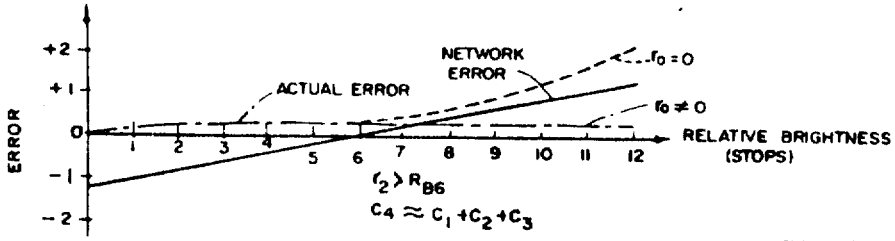

It is interesting to consider the effect on the compensation where $r_2$ is made of the same order of magnitude as the value of the element resistance at the crossover level. With the same constraint on $C_4$, this result is shown in FIG. 8. While this may appear to be undersirable, it is significant in that it demonstrates that judicious selection of values of $r_2$ and $C_4$ permits the matching of the electrical characteristics of a timing circuit to compensate for errors introduced into a system by other components.

Where the constraint that $C_4$ be greater than $C_1+C_2+C_3$ is absent, greater flexibility in modifying the network error curve is obtained. For example, where $C_4 \doteq C_1+C_2+C_3$, an improvement is achieved when $r_2$ is of the same order of magnitude as the resistance $R_{B6}$ of the element at the crossover level, as can be seen in FIG. 9. An even greater improvement is achieved, when $C_4=C_1+C_2+C_3$, by making $r_2$ larger than $R_{B6}$. This is shown in FIG. 10. In view of the above, it may be concluded that the effect of making $r_2$ larger in comparison to the resistance of the photoconductive element at the crossover level has the effect of keeping the error close to zero at the crosover level; and the effect of making $C_4$ large in comparison to $C_1+C_2+C_3$ is to make the actual exposure time larger than the correct exposure time (not taking into account the failure of the film to obey Equation 4 in the lower portion of the range of interest). The latter is exactly what is desired as evidenced by FIGS. 8 and 7.

Figure 11:
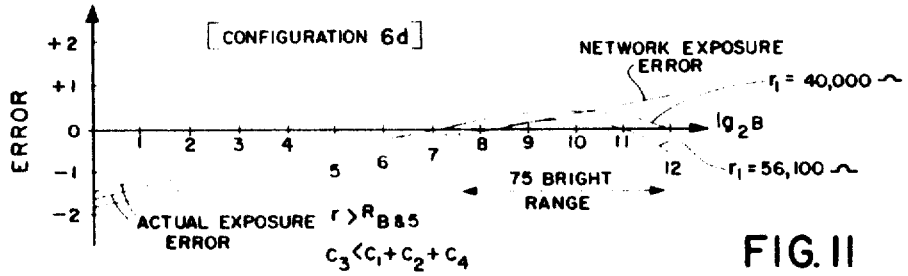
Figure 12:
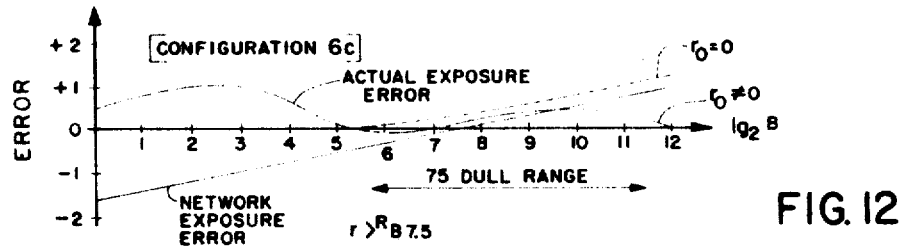

The accuracy of the general conclusions reached above concerning the effect on the network error at levels below the crossover level of an impedance generally of the form of a series resistor and capacitor branch shunting the timing capacitor of the timing network, is demonstrated by the comparison of FIG. 11 with FIG. 12. FIG 11 shows the network and actual exposure errors for the impedance configuration of FIG. 6(d) wherein the resistance of the branch is constituted by the parallel combination of $r_1$ and $r_2$, and the capacitor is $C_3$. Such configuration is connected to terminal 49 of the timing network when disc 61 is rotated until the indicia "75 bright" is readable through opening 65. As indicated in Chart II, this configuration is intended to be used over the range of $lg_2$ B of 8 to 12 with a relative aperture of 0.25. FIG. 12, on the other hand, shows the network and actual exposure errors for the impedance configuration of FIG. 6(c) wherein the resistance is $r_2$ and the capacitor is $C_4$. The latter configuration is connected to terminal 49 of the timing network when disc 61 is rotated until the indicia "75 dull" is readable through opening 65. As indicated in Chart II, this configuration is intended to be used over the range of $lg_2$ B of 6 to 12 with a relative aperture of unity. Suppose, for reasons beyond the scope of the disclosure, the values of the four capacitors available are as follows: $C_1=0.2$ $\mu$f.; $C_2=3.5$ $\mu$f.; $C_3=3.5$ $\mu$f. and $C_4=20$ $\mu$f. so that if the trigger voltage is 0.74 $E_0$, the crossover level of the network error for each of the four programs is as follows: "3200 indoor" at $lg_2$ B=4.5, for the intended operating range from 0 to 8; "3200 outdoor" at $lg_2$ B=7 for the intended operating range from 5 to 12; "75 dull" at $lg_2$ B=7.5 for the intended operating range from 6 to 12; and "75 bright" at $lg_2$ B=8.5 for the intended range from 8 to 12. Considering the "75 bright" program first, the capacitor of the impedance configuration $C_3$, is much less than the capacitor of the timing network, $C_1+C_2+C_4$, so that even if the resistance of $r_1$ and $r_2$ in parallel were greater than the resistance of the photoconductive element at the crossover, $R_{B6,5}$, one would expect to obtain an actual exposure error curve generally like that of FIG. 10. This is indeed the case as can be seen from FIG. 11 which shows the actual error for two different values of $r_1$ and the same value for $r_0$, namely 143 ohms. Note that both values of $r_1$ produces a trigger generation time that is between the correct exposure time and the network time in ranges at both the lower and upper ends of the level of brightness scale. Considerable improvement in the lower end of the scale could be achieved if additional capacitance could be shunted with $C_3$ to make the resultant larger than $C_1+C_2+C_4$. However, when the level of brightness drops below $lg_2$ B=8, the operator would apparently shift the program from "75 bright" to "75 dull" achieving the result shown in FIG. 12. Here, time exposures can be achieved automatically that would have almost the proper exposure since the actual exposure error below $lg_2$ B=6 is less than that shown due to reciprocity failure. Of course, the operator would have to keep portion 30 depressed sufficiently long to permit the automatic timing to be placed.

When a subject being photographed is illuminated by a flash tube, the brightness of the subject changes with time in the same manner that the intensity of the output of the flash tube changes with time. The magnitude of the peak level of brightness, occurring simultaneously with the peak output intensity of the flash tube, is related to the distance from the flash to the subject; and the time-integral of the brightness curve evaluated between the limits defined by the initiation and termination of exposure by the shutter blades is the amount of light received by the film.

When shutter timing apparatus of the type described is used under transient lighting conditions, the response speeds of the photoconductive element and the shutter blades, as well as the linearity of the element exert an influence on the exposure error. The response speed of the photoconductive element is concerned with the inability of the resistance of the element to instantaneously track rapid changes in brightness caused by the transient nature of a flash illumination. The response speed of the shutter blades is concerned with the time required for the blades to move between their respective blocking and unblocking positions.

Figure 13A:
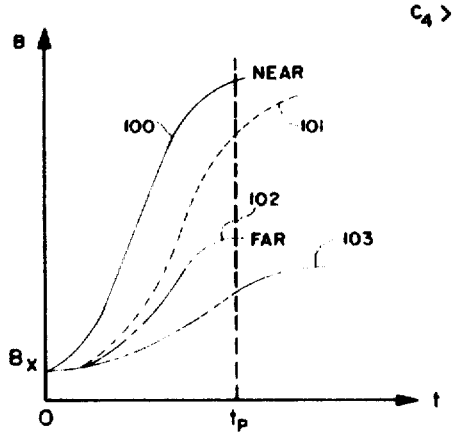
Figure 13B:
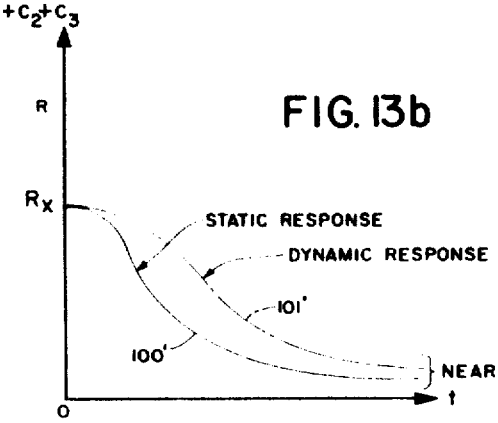

FIG. 13(a) shows the effect of the response lag of the photoconductive element for a subject at two distances from the flash. If the flash is actuated at time zero, the brightness of the subject increases rapidly from its ambient brightness $B_x$ to a peak at time $t_p$, according to curve 100, which is typical for a subject close to the flash. The resistance of the photoconductive element cannot change as rapidly as the brightness. If it could, the time variation of the resistance (called the static response, since the resistance would have values determined by the steady state brightness-resistance characteristic) would have the form shown at 100' in FIG. 13(b). Actually, the resistance changes with time more slowly as shown at 101' in FIG. 13(b), and is termed the dynamic response. Thus, the response of an actual element to brightness changing according to curve 100 is the same as a perfect element (no lag) to a flash curve like that at 101 in FIG. 13(a). When the subject is further from the flash, its brightness would actually vary according to curve 102, while the photoconductive element, responding even more slowly to the less intense light, responds as if the brightness were changing according to curve 103.

FIG. 14 shows the effect of shutter blade delay time. If X-sync-flash is used, the flash is initiated at substantially the same time that the opening blade begins to move (closing of S2) or exposure is initiated. If the flash occurs at time zero, exposure is initiated at time $\delta$, and terminated at time $t_f+\delta$, where $(t_f+0)$ is the trigger generation time, and $\delta$ is the blade delay time. Recalling that the amount of light received by the film is the time-integral of the brightness curve evaluated between termination and initiation of exposure, the area under curve 100 (shown cross-hatched) represents the light received by the film. Obviously, the area under the curve from time zero to time $t_f$, which would be the light received by the film in the absence of blade delay, is considerably different from the actual amount of light received by the film.

If the photoconductive element were linear ($\alpha=1$), had no response lag, and if the blade delay were zero, the exposure error would be independent of the distance to the subject. This is indicated in FIG. 15 by curve 104. However, since practical elements are nonlinear and exhibit response lag as described above, and since blade delay does in fact exist, the circuits shown in FIG. 6 would respond generally as shown by curve 105 in FIG. 15. That is to say, the exposure error is generally monotonic increasing function of distance of the photoconductive element from a subject illuminated by a flash bulb. In addition, the film would be considerably overexposed, this being indicated by the positive exposure error.

The error due to the response lag and blade delay can be reduced as follows (1) attenuating the light reaching the photoconductive element when the latter is used under the steady state light conditions, adjusting the parameters of the timing circuit to produce the desired exposure over the range of steady state light conditions of interest, and decreasing the attenuation of the light reaching the photoconductive element when the latter is used under transient light conditions, all to the end that the error curve is vertically shifted downwardly to reduce the exposure time; and (2) introducing into the timing circuit, when the latter is used under transient light conditions, an impedance which is effective to flatten-out the error curve.

The attenuation will be considered first. It will be recalled that under steady state light conditions, it was decided to provide a zero error at $\lg_2 B=6$ where the resistance of the photoconductive element was 10,000 ohms. If a light attenuator were placed in the field of view of the photoconductive element, which is to say that the light reaching the element would be attenuated, the resistance of the element at each level of scene brightness would be higher than the resistance at corresponding levels without the attenuator. In other words, if the photoconductive element is 50% masked, it would have a resistance at $\lg_2 B=6$ of 17,500 ohms (if $\alpha=0.8$) instead of 10,000 ohms. Therefore, to maintain zero error at this level, it is necessary to adjust the parameters of the timing circuit, either by changing the value of the capacitor in the timing network or reducing the trigger voltage. If one chooses to reduce the trigger voltage, the new value of $$V_1/E_0$$

according to Equation 5 is about 0.53 compared to 0.73. The significant thing is that the provision of a certain amount of attentuation on the light reaching the photoconductive element coupled with a corresponding adjustment to the circuit parameters sufficient to produce the desired exposure under steady state light conditions produces a device which, while operating in the same manner as previously described, has the capability of achieving new and improved results when properly utilized under transient lighting conditions.

If the masked element were used when the subject were illuminated by a flash bulb, the resultant error curve would be that shown at 105 in FIG. 15 provided the parameters of the timing circuit were adjusted in the manner previosuly described. In other words, curve 105 represents the error for an unmasked element when $$\frac{V}{E_0}=0.73$$

and the error for a 50% masked element when $$\frac{V}{E_0}=0.53$$

However, when the mask is removed prior to using the device under transient light conditions, and the parameters of the timing circuit are left unchanged, the resultant error curve is shifted vertically downward as shown at 106 to reduce the overexposure as a function of distance to subject. This shift can be understood by making reference to a subject a distance d from the camera. When the element is not provided with a mask, and when the circuit parameters adjusted to provide proper exposure under steady state light, $$\frac{V}{E_0}=0.73$$

in the example above, use of the device under transient light conditions produces a certain amount of overexposure, the exposure error being $\epsilon_1$. If the trigger voltage was reduced, say to $$\frac{V}{E_0}=0.53$$

it is obvious that the trigger generation time will also be reduced, along with the amount of light received by the film since this is the time-integral of the brightness evaluated between the opening and closing of the shutter blades. This reduction in exposure results in a vertically downward shift in the error from $\epsilon_1$ to $\epsilon_2$. While this reduction in trigger voltage has materially improved the error response under transient light, it is believed obvious, now, that to obtain the desired error response under steady state conditions masking of the element must be resorted to when the light is steady state.

This exposition is intended to indicate the dual approach to a method by which an essentially nonlinear photoconductive element having an inherent response lag to transient light can be utilized in a shutter timing apparatus that will operate adequately under both steady state and transient conditions. One method is to attenuate the light incident on the element, adjust the circuit parameters of the timing circuit to provide the desired exposure under steady state light conditions, and then reduce he attenuation when the light is transient without changing the parameters. The other method is to attenuate the light incident on the element, adjust the parameters of the timing circuit to provide the desired exposure under transient light conditions, and then increase the attenuation when the light is steady state without charging the parameters.

The use of an impedance in the timing circuit to further reduce the overexposure is considered now. The provision of a resistor between the capacitor means of the timing network and ground is effective to cause an initial voltage to appear at the output terminal of the network such that the trigger generation time is shortened. In other words, the resistor provides a way to advance tiggering of the voltage sensitive trigger circuit so that the amount of light entering the exposure aperture during the closing blade delay will not cause a great deal of overexposure. Typically, this is called X-sync compensation. The result is a further vertically downward shift in the error response to curve 107. Curve 107 is flattened because the amount of light excluded from the film due to the advance triggering changes with distance of the subject. A basis by which a given error curve dependent upon distance to the subject can be adjusted to provide desired results has been described. First, the masking of the photocell during steady state operation and unmasking of the cell during flash operation permit a reduction in the trigger voltage which beneficially shifts the error curve under flash operation without affecting the error curve under steady state conditions. Second, the addition of a fixed resistor in series with the timing capacitor provides a way to advance triggering and flatten the error curve. Both of these approaches permit the distance to the subject at which the error is zero to be adjusted. Obviously, the degree of masking and the size of the fixed resistor depend upon the particular response characteristics of the photoconductive element; the blade delay time, and the ambient lighting conditions under which flash operations are to be carried out. In addition, the compensating network effective when the apparatus is used under steady state light may also be effective to flatten out the error curve.

The above-described invention can be embodied into camera apparatus as shown in FIG. 1. To initiate flash tube 75, shutter control means 18 is provided with switch S3 positioned in the path of pin 76 rigidly attached to opening blade 19. Thus, tube 75 may be ignited at the instant the opening blade moves to unblocking position. While tube 75 is shown wired directly across battery 56 through switch S3, it will be obvious that a different battery could be used, with S3 being the synchronizing switch.

To provide the X-sync compensation, resistors 77 and 78 are provided in the $C_2$, $C_3$ branch of the compensation network. These capacitors are connected directly to terminal 48 by selectively operable switch 79. With switch 79 in the position shown in FIGURE 1, resistors 77 and 78 are shunted out of the compensating network. In this position, the shutter timing apparatus is suitable for use with steady state light conditions. With switch 60 rotated to "75 dull," and switch 79 opened, the circuit configuration is shown in FIG. 16. In this position, the shutter timing apparatus is suitable for flash operation.

In order to provide selective masking of photoconductive element 45, a selectively positionable attenuator 80' is suitably mounted (by means not shown) on the camera housing in front of the element. In one operable position, the attenuator prevents a predetermined amount of light within the field of view of element 45 from impinging on the sensitive area thereof; and this position is used for making exposures under steady state lighting conditions. In another operable position, the attenuator effects passage of all of the light within the field of view and this position is used for making exposures under flash conditions.

To facilitate the masking and unmasking of the photoconductive element, it is convenient to mechanically couple attenuator 80 to switch 79 in such a way that when the attenuator is made effective to mask the element, coupling 81 is caused to open switch [70] *79* to insert the X-sync resistors 77 and 78 in the circuit. Accidental failure to properly position the attenuator when an operator desires to use flash can be prevented by mechanically coupling flash apparatus 82 to coupling means 81 so that the attachment of apparatus 82 to the camera serves to properly position the attenuator and switch 79. For reasons of clarity, the last-mentioned coupling is omitted from the drawing.

To improve the results attainable with transient as well as steady state illumination, it may be advisable to provide a variable density filter that is movably mounted relative to the photoconductive element. This expedient provides a "trim" arrangement by which the exposure error curves can be modified slightly to match a particular situation. For example, where a dark subject is to be photographed against a light background, the brightness to which the element would respond would be the average brightness of the scene as a whole, rather than the particular brightness of the subject. Generally, underexposure of the subject will result. To preclude this, the variable density filter could be interposed between the subject and the photoconductive element to reduce the average scene brightness to a value that permits correct exposure of the subject.

Obviously, the "trim" described above can be used adventageously during either steady state or flash illumination. This type of light attenuation so far as the element is concerned, is not to be confused with the masking technique referred to above which is used to permit lowering of the trigger voltage. Thus, terminology relating to causing the light reaching the element from a scene being photographed when the subject is under steady state illumination to be attenuated in comparison to the light reaching the film, refers, not to the variable density filter used as a "trim," but to the masking means. Additionally, terminology relating to causing the light reaching the element when the subject is under transient illumination to be of substantially the same intensity also refers to the masking means, even though the filter is in place as a "trim" to make the intensities slightly different. Stated otherwise, the "trim" filter amounts to a second order effect on the relative intensities of the light as seen by the element and the film. The primary effect of the masking means is to substantially increase the difference between the intensity of light reaching the element and the intensity of light reaching the film for the purpose of permitting a substantial reduction in the trigger voltage.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera having shutter means for controlling exposure for photographing a scene that can have different levels of brightness such that the correct exposure is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an R-C circuit including a connection, and being constructed and arranged so that when activated, said R-C circuit is effective to generate at said connection, a time variable voltage that changes from an initial voltage, when said R-C circuit is activated to a preselected voltage, termed the trigger voltage, in a period of time termed the trigger generation time of the R-C circuit;

(e) means to activate said R-C circuit substantially at the same time said voltage sensitive trigger circuit actuates said shutter operator means;

(f) said voltage sensitive trigger circuit being responsive to the voltage at said connection for deactuating said shutter operator means when the voltage there reaches said trigger voltage whereby the actual actuation time of said shutter operator means is essentially equal to the trigger generation time of said R-C circuit;

(g) said R-C circuit also including capacitor means coupled by said connection to a photoresponsive element exposed to light from said scene, said element having a resistance that is functionally related to the level of scene brightness;

(h) said capacitor means, photoresponsive element and connection therebetween constituting a timing network so constructed and arranged, that if said R-C circuit consisted only of said timing network, it could be activated to generate at said connection, a time variable voltage that would reach said trigger voltage in a period of time, termed the network time, dependent upon the capacitance of said capacitor means and the resistance of said element as established by the level of scene brightness, whereby the trigger generation time of said R-C circuit when it consists only of said timing network is the network time;

(i) the functional relationship between the resistance of said element and the level of scene brightness being such that; at each level of scene brightness in a first range thereof, the network time is less than the correct exposure time, and at each level of scene brightness in a second range thereof, the network time is greater than the correct exposure time; and (j) said R-C circuit including compensating means for causing, at each level in said first range, the actual actuation time as established by the trigger generation time of said R-C circuit to be greater than said network time.

2. Apparatus in accordance with claim 1 wherein said R-C circuit includes compensation means for causing, at each level in said second range, the actual actuation time to be less than said network time.

3. Apparatus in accordance with claim 2 wherein the last-named means is effective to make said initial voltage directly related to the levels of brightness in said second range.

4. In a camera having shutter means for controlling exposure for photographing a scene that can have different levels of brightness, light response shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an R-C circuit including a connection, and being constructed and arranged so that when activated said R-C circuit is effective to generate at said connection, a time variable voltage that changes from an initial voltage, when said R-C circuit is activated to a preselected voltage, termed the trigger voltage, in a period of time termed the trigger generation time of the R-C circuit;

(e) means to activate said R-C circuit substantially at the same time said voltage sensitive trigger circuit actuates said shutter operator means;

(f) said voltage sensitive trigger circuit being responsive to the voltage at said connection for deactuating said shutter operator means when the voltage reaches said trigger voltage whereby the actual actuation time of said shutter operator means is essentially equal to the trigger generation time of said R-C circuit;

(g) said R-C circuit also including capacitor means coupled by said connection to a photoresponsive element exposed to light from said scene, said element having a resistance that is funcionally related to the level of scene brightness;

(h) said capacitor means, photoresponsive element and connection therebetween constituting a timing network so constructed and arranged, that if said R-C circuit consisted only of said timing network, it could be activated to generate at said connection, a time variable voltage that would reach said trigger voltage in a period of time, termed the network time, dependent upon the capacitance of said capacitor means and the resistance of said element as established by the level of scene brightness, whereby the trigger generation time of said R-C circuit when it consists only of said timing network is the network time;

(i) said R-C circuit including compensation means including fixed resistance means having a first portion with a value that is large in comparison to the resistance of said element at a particular level of scene brightness; and (j) said first portion being effective, at each level of brightness in a range thereof less than said particular level, to cause the trigger generation time of said R-C circuit to be greater than the network time.

5. Apparatus in accordance with claim 4 wherein said fixed resistance means has a second portion with a value that is small in comparison to the resistance of said element at said particular level, said second portion being effective, at each level of scene brightness in a range thereof greater than said particular level, to cause the trigger generation time of said R-C circuit to be less than the network time.

6. In a camera having shutter means for controlling exposure for photographing a scene that can have different levels of brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an R-C circuit including a connection, and being constructed and arranged so that when activated, said R-C circuit is effective to generate at said connection, a time variable voltage that changes from an initial voltage, when said R-C circuit is activated, to a preselected voltage, termed the trigger voltage, in a period of time termed the trigger generation time of the R-C circuit;

(e) means to activate said R-C circuit substantially at the same time said voltage sensitive trigger circuit actuates said shutter operator means;

(f) said voltage sensitive trigger circuit being responsive to the voltage at said connection for deactuating said shutter operator means when the voltage reaches said trigger voltage whereby the actual actuation time of said shutter operator means is essentially equal to the trigger generation time of said R-C circuit;

(g) said R-C circuit also including capacitor means coupled by said connection to a photoresponsive element exposed to light from said scene, said element having a resistance that is functionally related to the level of scene brightness;

(h) said capacitor means, photoresponsive element and connection therebetween constituting a timing network so constructed and arranged, that if said R-C circuit consisted only of said timing network it could be activated to generate at said connection, a time variable voltage that would reach said trigger voltage in a period of time, termed the network time, dependent upon the capacitance of said capacitor means and the resistance of said element as established by the level of scene brightness, whereby the trigger generation time of said R-C circuit when it consists only of said timing network is the network time; and (i) said R-C circuit including an impedance shunting said capacitor means including: a fixed resistance, with a value that is large in comparison to the resistance of said element at a particular level of scene brightness, in series with a fixed capacitor means whereby said impedance is effective, at each level of brightness in a range thereof less than said particular level, to cause trigger generation time of said R-C circuit to be greater than the network time.

7. Apparatus in accordance with claim 6 wherein means are included to increase the initial value of said voltage in proportion to the increase in the level of brightness over said particular level.

8. Apparatus in accordance with claim 6 wherein the capacitance of said fixed capacitor means is large in comparison to the capacitance of the capacitor means of said timing network.

9. In a camera having shutter means for controlling exposure for photographing a scene that can have different levels of brightness such that the correct exposure is functionally related to the level of scene brightness, light [reponsive] *responsive* shutter control means comprising:

(a) shutter operator means actuatable to cause said shutter means to initiate exposure and deactuatable to cause the shutter means to terminate exposure so that to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;
(d) a pair of terminals;
(e) a series impedance connected across said terminals, including capacitor means, and a photoresponsive element exposed to light from said scene and having a resistance functionally related to the level of scene brightness;
(f) a voltage source of constant potential;
(g) means to connect said source to said terminals substantially at the same time said voltage sensitive trigger circuit actuates said shutter operator means whereby a time variable voltage is generated across said capacitor means of said series impedance that changes from an initial voltage when said source is connected to said terminals to a preselected voltage, termed the trigger voltage, in a period of time termed the trigger generation time;
(h) said voltage sensitive trigger circuit being responsive to the voltage across said capacitor means for deactuating said shutter operator means when the voltage there reaches said trigger voltage whereby the actual actuation time of said shutter operator means is essentially equal to the trigger generation time;
(i) the level of brightness response of said photoresponsive element being such that there is at least one level of scene brightness, termed the crossover level, at which said trigger generation time is equal to the correct actuation time;
(j) compensating impedance means shunting said capacitor means including a fixed resistance connected to said capacitor means; and
(k) said fixed resistor being greater than the value of the resistance of said photoconductive element at said crossover level.

10. In a camera having shutter means for controlling exposure for photographing a scene that can have different levels of brightness such that the correct exposure is functionally related to the level of scene brightness, light responsive shutter control means comprising:
(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;
(b) a voltage sensitive trigger circuit for actuating and deactuating said shutter operator means;
(c) means for causing said voltage sensitive trigger circuit to actuate said shutter operator means;
(d) a pair of terminals;
(e) a series impedance connected across said terminals, including capacitor means and a photoconductive element exposed to light from said scene and having a resistance functionally related to the level of scene brightness;
(f) a voltage source of constant potential;
(g) means to connect said source to said terminals substantially at the same time said voltage sensitive trigger circuit actuates said shutter operator means, whereby a time variable voltage is generated across said capacitor means of said series impedance that changes from an initial voltage when said source is connected to said terminals to a preselected voltage termed the trigger voltage, in a period of time termed the trigger generation time;
(h) said voltage sensitive trigger circuit being responsive to the voltage across said capacitor means for deactuating said shutter operator means when the voltage reaches said trigger voltage whereby the actual actuation time of said shutter operator means is essentially equal to the trigger generation time;
(i) the level of brightness response of said photoresponsive element being such that there is at least one level of scene brightness, termed the crossover level, at which said trigger generation time is equal to the correct actuation time;
(j) compensating impedance means shunting said capacitor means including a fixed resistance in series with fixed capacitor means; and
(k) said fixed resistor being greater than the value of the resistance of said photoconductive element at said crossover level.

11. Apparatus in accordance with claim 10 wherein the capacitance of said fixed capacitor means is greater than the capacitance of the said capacitor means of said series impedance.

12. Apparatus in accordance with claim 10 wherein the capacitance of said fixed capacitor means is less than the capacitance of the said capacitor means of said series impedance.

13. In a camera having shutter means for controlling exposure for photographing a scene that can have different levels of brightness such that the correct exposure is functionally related to the level of scene brightness, light responsive shutter control means comprising:
(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;
(b) a voltage sensitive trigger circuit for actuating and deactuating said shutter operator means;
(c) means for causing said voltage sensitive trigger circuit to actuate said shutter operator means;
(d) a pair of terminals;
(e) a series impedance connected across said terminals, including capacitor means, and a photoresponsive element exposed to light from said scene and having a resistance functionally related to the level of scene brightness;
(f) a voltage source of constant potential;
(g) means to connect said source to said terminals substantially at the same time said voltage sensitive trigger circuit actuates said shutter operator means, whereby a time variable voltage is generated across said capacitor means of said series impedance that changes from an initial voltage when said source is connected to said terminals to a preselected voltage, termed the trigger voltage, in a period of time termed the trigger generation time;
(h) said voltage sensitive trigger circuit being responsive to the voltage across said capacitor means for deactuating said shutter operator means when the voltage reaches said trigger voltage whereby the actual actuation time of said shutter operator means is essentially equal to the trigger generation time;
(i) the level of brightness response of said [photoreponsive] *photoresponsive* element being such that there is at least one level of scene brightness, termed the crossover level, at which said trigger generation time is equal to the correct actuation time;
(j) diaphragm means containing at least two apertures of different areas and being movable so that each aperture can be selectively positionable on the optical axis of said camera for controlling the size of the exposure aperture;
(k) fixed capacitor means; and
(l) switch means responsive to the movement of said diaphragm means for shunting said fixed capacitor means across the said capacitor means of said series impedance when the smaller of the two apertures is positioned on said optical axis and disconnecting said fixed capacitor means from across the said capacitor means of said series impedance when the larger of the two apertures is positioned on said optical axis.

14. Apparatus in accordance with claim 13 wherein the capacitance of said fixed capacitor means is greater than the capacitance of the said capacitor means of said series impedance.

15. Apparatus in accordance with claim 13 wherein the ratio of the capacitance of said fixed capacitor means to the capacitance of the said capacitor means of said series impedance is approximately the inverse of the ratio of the area of the smaller aperture to the larger.

16. In a camera having shutter means for controlling the exposure of film for photographing a scene that can have different levels of brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) a pair of terminals;

(e) primary impedance means connected across said terminals including capacitor means, and a photoresponsive element exposed to light from said scene and having a resistance functionally related to the level of scene brightness[.] ;

(f) the level of brightness response of the resistance of said photoresponsive element being different from the level of brightness response of said film over a range of levels of brightness;

(g) said primary impedance means being constructed and arranged so that the application of a voltage source to said terminals causes a time variable voltage to be generated across a portion of said primary impedance means that changes from an initial voltage when said source is connected to said terminals to a preselected voltage, termed the trigger voltage, in a period of time termed the trigger generation time;

(h) a voltage source;

(i) means to connect said source to said terminals substantially at the same time said voltage sensitive trigger circuit actuates said shutter operator means whereby said primary impedance means generates said trigger voltage;

(j) said voltage sensitive trigger circuit being responsive to the voltage generated by said primary impedance means for deactuating said shutter operator means when the voltage reaches said trigger voltage whereby the actual actuation time of said shutter operator means is essentially equal to the trigger generation time; and (k) compensating impedance means connected to shunt a portion of said primary impedance means for causing the trigger generation time to be different over one portion of said range, when said compensating impedance means is connected to shunt the last-named portion of said primary impedance means, than when said compensating impedance means is disconnected from shunt with said last-named portion of said primary impedance means, without causing a substantial difference in the trigger generation time over another portion of said range.

17. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an electrical network including capacitor means coupled to a photoresponsive element exposed to light from said scene, said element having a resistance functionally related to the level of scene brightness;

(e) said network having an input and an output and being so constructed and arranged that when a voltage source is connected to said input there appears at said output a voltage which changes from an initial voltage, when the voltage source is applied, to a preselected voltage termed the trigger voltage, in a period of time, termed the trigger generation time, dependent at least upon the resistance of said element as established by the level of scene brightness;

(f) there being only one level of scene brightness, termed the crossover level, in a range of levels, at which said trigger generation time is equal to the correct actuation time whereby at other levels in said range the difference between the trigger generation time and the correct actuation time constitutes an error;

(g) a voltage source;

(h) means to connect said source to said input substantially at the same time said voltage sensitive trigger circuit actuates said shutter operator means;

(i) said voltage sensitive trigger circuit being responsive to the voltage at said output for deactuating said shutter operator means when the voltage reaches said trigger voltage, whereby the actual actuation time of said shutter operator means is essentially equal to the trigger generation time;

(j) compensation means, which when connected to said network, will reduce said error; and (k) means connecting said compensation means to said network.

18. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an electrical network including capacitor means coupled to a photoresponsive element exposed to light from said scene, said element having a resistance functionally related to the level of scene brightness;

(e) said network having an input and an output and being so constructed and arranged that when a voltage source is connected to said input there appears at said output a voltage which changes from an initial voltage, when the voltage source is applied, to a preselected voltage termed the trigger voltage in a period of time, termed the trigger generation time, dependent at least upon the resistance of said element as established by the level of scene brightness;

(f) there being only one level of scene brightness[:], termed the crossover level, in a range of levels of brightness, at which said trigger generation time is equal to the correct actuation time whereby the difference between the trigger generation time and the correct actuation time at levels above and below said crossover level constitutes an error;

(g) a voltage source;

(h) means to connect said source to said input substantially at the same time said voltage sensitive trigger circuit actuates said shutter operator means;

(i) said voltage sensitive trigger circuit being responsive to the voltage at said output for deactuating said shutter operator means when the voltage reaches said trigger voltage, whereby the actual actuation time of said shutter operator means is essentially equal to the trigger generation time;

(j) compensation means, which when connected to said network will reduce said error at levels below said crossover level without substantially changing the error at levels above said crossover level; and (k) means connecting said compensation means to said network.

19. Apparatus in accordance with claim 18 wherein additional compensation means are provided which is effective to reduce said error at levels above said crossover level without substantially changing the error at levels below said crossover level.

20. Apparatus in accordance with claim 18 wherein said compensation means includes a fixed resistance whose value is large in comparison to the resistance of said element at said crossover level.

21. Apparatus in accordance with claim 18 wherein said compensation means is constituted by a fixed resistance connected in series with an impedance, and said fixed resistance has a value that is greater than the resistance of said element at said crossover level.

22. Apparatus in accordance with claim 18 wherein said compensation means is constituted by a fixed resistance connected in series with an impedance, said fixed resistance being larger than the resistance of said element and the last-named impedance being larger than the impedance of said capacitor means of said network.

23. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an electrical network including capacitor means coupled to a photoresponsive element exposed to light from said scene, said element having a resistance functionally related to the level of scene brightness;

(e) said network having an input and an output and being so constructed and arranged that when a voltage source is connected to said input there appears at said output a voltage which changes from an initial voltage, when the voltage source is applied, to a preselected voltage termed the trigger voltage in a period of time, termed the trigger generation time, dependent at least upon the resistance of said element as established by the level of scene brightness;

(f) there being only one level of scene brightness, termed the crossover level, in a range of levels, at which said trigger generation time is equal to the correct actuation time whereby at other levels in said range the difference between the trigger generation time and the correct actuation time constitutes an error;

(g) a voltage source;

(h) means to connect said source to said input substantially at the same time said voltage sensitive trigger circuit actuates said shutter operator means;

(i) said voltage sensitive trigger circuit being responsive to the voltage at said output for deactuating said shutter operator means when the voltage reaches said trigger voltage, whereby the actual actuation time of said shutter operator means is essentially equal to the trigger generation time;

(j) diaphragm means containing at least two apertures of different areas and being movable so that each aperture can be selectively positionable on the optical axis of said camera for controlling the size of the exposure aperture;

(k) fixed capacitor means; and (l) switch means responsive to the movement of said diaphragm means for shunting said fixed capacitor means across the said capacitor means of said network when the smaller of the two apertures is positioned on said optical axis, and disconnecting said fixed capacitor means from across the said capacitor means of said network when the larger of the two apertures is positioned on said optical axis.

24. Apparatus in accordance with claim 23 wherein the capacitance of said fixed capacitor means is greater than the capacitance of the said capacitor means of said network.

25. Apparatus in accordance with claim 24 wherein the capacitance of said fixed capacitor means is such that the crossover level remains substantially the same regardless of which aperture means is aligned with said optical axis.

26. Apparatus in accordance with claim 24 wherein the capacitance of said fixed capacitor means is such that the crossover level when the smaller of the two apertures is aligned with said optical axis is greater than when the larger of the two apertures is aligned with said optical axis.

27. In a camera having shutter means for controlling exposure for photographing on film a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an electrical network including capacitor means coupled to a photoresponsive element exposed to light from said scene, said element having a resistance functionally related to the level of scene brightness;

(e) said network having an input and an output and being so constructed and arranged that when a voltage source is connected to said input there appears at said output a voltage which changes from an initial voltage, when the voltage source is applied, to a preselected voltage, termed the trigger voltage in a period of time, termed the trigger generation time, dependent at least upon the resistance of said element as established by the level of scene brightness;

(f) the level of scene brightness response of the resistance of said element being different from the level of scene brightness response of the film so that in a range of levels, there is only one level at which said trigger generation time is equal to the correct actuationt ime, and at other levels in said range there is a difference between the trigger generation time and the correct actuation time;

(g) a voltage source;

(h) means to connect said source to said input substantially at the same time said voltage sensitive trigger circuit actuates said shutter operator means;

(i) said voltage sensitive trigger circuit being responsive to the voltage at said output for deactuating said shutter operator means when the voltage reaches said trigger voltage, whereby the actual actuation time of said shutter operator means is essentially equal to the trigger generation time;

(j) diaphragm means containing at least two apertures of different areas and being movable so that each aperture can be selectively positionable on the optical axis of said camera for controlling the size of the exposure aperture;

(k) fixed capacitor means whose capacitance is greater than the capacitance of the said capacitor means of said network;

(l) switch means responsive to the movement of said diaphragm means for shunting said fixed capacitor means across the said capacitor means of said network when the smaller of the two apertures is positioned on said optical axis, and disconnecting said fixed capacitor means from across the said capacitor means of said network when the larger of the two apertures is positioned on said optical axis; and (m) compensation means, which when connected to said network when the smaller of the two apertures is positioned on said optical axis, is effective to reduce the difference between the trigger generation time and the correct actuation time at levels of brightness below which the trigger generation time is equal to the correct actuation time.

28. Apparatus in accordance with claim 27 wherein said compensation means includes a fixed resistance whose value is greater than the resistance of said element at the level of scene brightness at which the trigger generation time is equal to the correct actuation time.

29. In a camera having shutter means for controlling exposure for photographing a scene that can have different levels of brightness such that the correct exposure is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a trigger circuit for actuating and deactuating said shutter operator means;

(c) means for causing said trigger circuit to actuate said shutter operator means;

(d) a timing circuit constructed and arranged so that when activated, said timing circuit is effective to generate a time variable electrical quantity that changes from an initial value, when said timing circuit is activated, to a preselected value, termed the trigger value, in a period of time termed the trigger generation time of the timing circuit;

(e) means to activate said timing circuit substantially at the same time said trigger circuit actuates said shutter operator means;

(f) said trigger circuit being responsive to the value of said electrical quantity for deactuating said shutter operator means when the value reaches said trigger value whereby the actual actuation time of said shutter operator means is essentially equal to the trigger generation time of said timing circuit;

(g) said timing circuit also including a photoresponsive element exposed to light from said scene, said element having an electrical property that is functionally related to the level of scene brightness;

(h) said photoresponsive element constituting a part of a timing network so constructed and arranged, that if said timing circuit consisted only of said timing network, it could be activated to generate a time variable electrical quantity that would reach said trigger value in a period of time, termed the network time, dependent upon the value of said electrical property of said element as established by the level of scene brightness, whereby the trigger generation time of said timing circuit when it consists only of said timing network is the network time;

(i) the functional relationship between said electrical property of said element and the level of scene brightness being such that, at each level of scene brightness in a first range thereof, the network time is less than the correct exposure time, and at each level of scene brightness in a second range thereof, the network time is greater than the correct exposure time; and (j) said timing circuit including compensating means for causing, at each level in said first range, the actual actuation time as established by the trigger generation time of said timing circuit to be greater than said network time.

30. Apparatus in accordance with claim 29 wherein said timing circuit includes compensation means for causing, at each level in said second range, the actual actuation time to be less than said network time.

31. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a trigger circuit for actuating and deactuating said shutter operator means;

(c) means for causing said trigger circuit to actuate said shutter operator means;

(d) an electrical network including a photoresponsive element exposed to light from said scene, said element having an electrical property functionally related to the level of scene brightness;

(e) said network having an input and an output and being so constructed and arranged that when a power source is connected to said input there appears at said output an electrical quantity which changes from an initial value, when the power source is applied, to a preselected value termed the trigger value, in a period of time, termed the trigger generation time, dependent at least upon said electrical property of said element as established by the level of scene brightness;

(f) there being only one level of scene brightness, termed the crossover level, in a range of levels, at which said trigger generation time is equal to the correct actuation time whereby at other levels in said range the difference between the trigger generation time and the correct actuation time constitutes an error;

(g) a power source;

(h) means to connect said source to said input substantially at the same time said trigger circuit actuates said shutter operator means;

(i) said trigger circuit being responsive to said electrical quantity at said output for deactuating said shutter operator means when the electrical quantity reaches said trigger value, whereby the actual actuation time of said shutter operator means is essentially equal to the trigger generation time;

(j) compensation means, which when connected to said network, will reduce said error; and (k) means connecting said compensation means to said network.

32. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a trigger circuit for actuating and deactuating said shutter operator means;

(c) means for causing said trigger circuit to actuate said shutter operator means;

(d) an electrical network including a photoresponsive element exposed to light from said scene, said element having an electrical property functionally related to the level of scene brightness;

(e) said network having an input and an output and being so constructed and arranged that when a power source is connected to said input there appears at said output an electrical quantity which changes from an initial value, when the power source is applied, to a preselected value termed the trigger value in a period of time, termed the trigger generation time, dependent at least upon said electrical property of said element as established by the level of scene brightness;

(f) there being only one level of scene brightness, termed the crossover level, in a range of levels of brightness, at which said trigger generation time is equal to the correct actuation time whereby the difference between the trigger generation time and the correct actuation time at levels above and below said crossover level constitutes an error;

(g) a power source;

(h) means to connect said source to said input substantially at the same time said trigger circuit actuates said shutter operator means;

(i) said trigger circuit being responsive to said electrical quantity at said output for deactuating said shutter operator means when the electrical quantity reaches said trigger value, whereby the actual actuation time of said shutter operator means is essentially equal to the trigger generation time;

(j) compensation means, which when connected to said network will reduce said error at levels below said crossover level without substantially changing the error at levels above said crossover level; and (k) means connecting said compensation means to said network.

33. Apparatus in accordance with claim 32 wherein additional compensation means are provided which is effective to reduce said error at levels above said crossover level without substantially changing the error at levels below said crossover level.

34. In a camera having shutter means for controlling exposure for photographing a scene that can have different levels of brightness such that the correct exposure time is functionally related to the level of scene brightness, light responsive shutter control means comprising:

(a) shutter operator means actuatable to cause said shutter means to initiate exposure and deactuatable to cause the shutter means to terminate exposure so that, to achieve the correct exposure, said shutter operator means is required to be actuated for a period of time termed the correct actuation time;

(b) a voltage sensitive trigger circuit for actuating and deactuating said shutter operator means;

(c) means for causing said voltage sensitive trigger circuit to actuate said shutter operator means;

(d) an electrical network including capacitor means coupled to a photoresponsive element exposed to light from said scene, said element having a resistance functionally related to the level of scene brightness;

(e) said network having an input and an output and being so constructed and arranged that when a voltage source is connected to said input there appears at said output a voltage which changes from an initial voltage, when the voltage source is applied, to a preselected voltage termed the trigger voltage in a period of time, termed the trigger generation time, dependent at least upon the resistance of said element as established by the level of scene brightness;

(f) there being only one level of scene brightness, termed the crossover level, in a range of levels, at which said trigger generation time is equal to the correct actuation time whereby at other levels in said range the difference between the trigger generation time and the correct actuation time constitutes an error;

(g) a voltage source;

(h) means to connect said source to said input substantially at the same time said voltage sensitive trigger circuit actuates said shutter operator means;

(i) said voltage sensitive trigger circuit being responsive to the voltage at said output for deactuating said shutter operator means when the voltage reaches said trigger voltage, whereby the actual actuation time of said shutter operator means is essentially equal to the trigger generation time;

(j) diaphragm means containing at least two apertures of different areas and being movable so that each aperture can be selectively positionable on the optical axis of said camera for controlling the size of the exposure aperture;

(k) fixed capacitor means; and (l) switch means responsive to the movement of said diaphragm means for connecting said fixed capacitor means to the said capacitor means of said network when the smaller of the two apertures is positioned on said optical axis, and disconnecting said fixed capacitor means from the said capacitor means of said network when the larger of the two apertures is positioned on said optical axis.

35. In a camera having shutter means for controlling exposure in order to photograph on film a subject that is under transient illumination such that the level of scene brightness varies during exposure and has an instantaneous value related to the distance of the camera from the subject, and wherein correct exposure is obtained when the time-integral of the level of scene brightness evaluated between initiation and termination of exposure has a predetermined value; light responsive shutter control means comprising:

(a) shutter operator means actuatable to cause said shutter means to initiate exposure and deactuatable to cause the shutter means to terminate exposure so that, the time interval between initiation and termination of exposure is substantially the same as the time interval during which said shutter operator means is actuated, but is not entirely concurrent therewith;

(b) a voltage sensitive trigger circuit for actuating and deactuating said shutter operator means;

(c) means for causing said voltage sensitive trigger circuit to actuate said shutter operator means;

(d) a pair of terminals;

(e) impedance means connected across said terminals including a photoresponsive element exposed to light from said scene and having a resistance functionally related to the instantaneous level of scene brightness;

(f) said impedance means being constructed and arranged so that the application of a voltage source to said terminals causes a time variable voltage to be generated across a portion of said impedance means that changes from an initial voltage when said source is connected to said terminals to a preselected voltage, termed the trigger voltage, in a period of time termed the trigger generation time;

(g) a voltage source;

(h) means to connect said source to said terminals substantially at the same time said voltage sensitive trigger circuit actuates said shutter operator means whereby said impedance means generates said trigger voltage;

(i) said voltage sensitive trigger circuit being responsive to the voltage generated by said impedance means for deactuating said shutter operator means when the voltage reaches said trigger voltage whereby the actual actuation time of said shutter operator means is essentially equal to the trigger generation time and is concurrent therewith;

(j) there being a range of distances of the subject from the camera at which the trigger generation time is such that the time-integral of the brightness in the interval between initiation and termination of exposure is different from said predetermined value whereby the differences constitute an exposure error;

(k) compensation means which when connected to said impedance means is effective to change the trigger generation time in such a way that said exposure error is less than the value thereof when said compensation means is not connected; and (l) means connecting said compensation means to said impedance means.

36. Apparatus in accordance with claim 35 wherein said compensation means includes a resistor of fixed value in series with capacitor means and effective to cause said initial voltage to be proportional to the value of said resistor.

37. Apparatus in accordance with claim 36 wherein said compensation means includes an impedance shunting said portion of said impedance means.

38. A photographic shutter mechanism comprising:

(a) an integrator circuit including a photoconductor exposed to the scene being photographed and a main timing capacitor connected to develop a time-variable voltage at a rate dependent on the resistance of said photoconductor;

(b) a shutter for initiating and terminating exposure through an exposure aperture;

(c) means responsive to the development of a predetermined voltage across said main timing capacitor to cause said shutter to terminate exposure; and (d) compensation impedance means in parallel with the main timing capacitor of said integrator circuit to limit exposure error by reducing the difference between the time interval required to develop said predetermined voltage and the time interval required for correct exposure.

39. Apparatus in accordance with claim 38 wherein said compensation impedance includes a resistance whose value is large in comparison to the resistance of said photoconductor at a particular level of brightness of said scene for causing the exposure time, at each level of brightness in a range thereof less than said particular level, to be greater than the exposure time that would result if said compensation impedance were disconnected from said main timing capacitor.

40. Apparatus in accordance with claim 39 wherein said compensation impedance includes another resistance whose value is small in comparison to the resistance of said photoconductor at said particular level for causing the exposure time, at each level of brightness in a range thereof greater than said particular level, to be less than the exposure time that would result if said compensation impedance were disconnected from said main timing capacitor.

41. Apparatus in accordance with claim 38 wherein said compensation impedance includes a resistor whose value is large in comparison to the resistance of said photoconductor at a particular level of brightness and is in series with a fixed capacitor.

42. Apparatus in accordance with claim 41 wherein the value of said fixed capacitor is large in comparison to the value of said main timing capacitor.

43. Apparatus in accordance with claim 42 wherein means are provided for causing an initial voltage to appear across said main timing capacitor just prior to the development of said voltage.

44. Apparatus in accordance with claim 43 wherein said initial voltage is proportional to the difference between the actual level of brightness of said scene and said particular level when said actual level exceeds said particular level.

45. Apparatus in accordance with claim 38 wherein there is at least one level of brightness, termed the crossover level, at which the exposure time is correct for the film being used, and said compensation impedance includes a fixed resistance whose value is greater than the value of the resistance of said photoconductor at said crossover level.

46. Apparatus in accordance with claim 45 wherein said fixed resistance is in series with a fixed capacitor.

47. Apparatus in accordance with claim 46 wherein said fixed capacitor has a value which is greater than the value of said main timing capacitor.

48. Apparatus in accordance with claim 46 wherein said fixed capacitor has a value less than the value of said main timing capacitor.

References Cited

The following references, cited by the Examiner, are of record in the patented file of this patent or the original patent.

UNITED STATES PATENTS

| | | | |
|---|---|---|---|
| 2,179,717 | 11/1939 | Fedotoff | 95—53 |
| 2,258,994 | 10/1941 | Merriman et al. | 95—53 |
| 2,428,566 | 10/1947 | Harder et al. | 323—78 |
| 2,856,831 | 10/1958 | Gipe | 95—62 |
| 2,961,597 | 11/1960 | Carleton | 323—78 |
| 2,999,445 | 9/1961 | Fahlenberg | 95—53 |
| 3,020,816 | 2/1962 | Frenk | 95—58 |
| 3,056,332 | 10/1962 | Beregowitz | 95—10 |
| 3,124,049 | 3/1964 | Ball | 95—10 |
| 3,143,046 | 8/1964 | Pennock et al. | 95—10 |

FOREIGN PATENTS

| | | |
|---|---|---|
| 225,515 | 1/1963 | Austria. |
| 830,755 | 3/1960 | Great Britain. |
| 864,320 | 4/1961 | Great Britain. |

JOHN M. HORAN, Primary Examiner

U.S. Cl. X.R.

95—53